(12) United States Patent
Taguchi

(10) Patent No.: US 8,515,615 B2
(45) Date of Patent: Aug. 20, 2013

(54) VEHICLE TRAVEL CONTROL APPARATUS

(75) Inventor: Koji Taguchi, Isehara (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 307 days.

(21) Appl. No.: 12/791,310

(22) Filed: Jun. 1, 2010

(65) Prior Publication Data

US 2010/0305804 A1   Dec. 2, 2010

(30) Foreign Application Priority Data

Jun. 1, 2009   (JP) ................................ 2009-132238

(51) Int. Cl.
  *G06F 7/00*         (2006.01)
(52) U.S. Cl.
  CPC ...................................... *G06F 7/00* (2013.01)
  USPC ............ 701/31.4; 701/36; 701/301; 340/436; 340/903
(58) Field of Classification Search
  USPC .................... 701/31.4, 93, 96; 340/436, 903
  See application file for complete search history.

(56) References Cited

U.S. PATENT DOCUMENTS

| | | | | |
|---|---|---|---|---|
| 5,940,010 | A * | 8/1999 | Sasaki et al. | 340/901 |
| 6,728,623 | B2 * | 4/2004 | Takenaga et al. | 701/96 |
| 6,970,779 | B2 * | 11/2005 | Kagawa et al. | 701/93 |
| 7,155,342 | B2 * | 12/2006 | Kobayashi et al. | 701/301 |
| 7,809,488 | B2 | 10/2010 | Egawa et al. | |
| 8,010,274 | B2 * | 8/2011 | Sawada | 701/96 |
| 2003/0093210 | A1 * | 5/2003 | Kondo et al. | 701/96 |
| 2005/0033517 | A1 * | 2/2005 | Kondoh et al. | 701/301 |
| 2005/0288844 | A1 * | 12/2005 | Kimura et al. | 701/100 |
| 2010/0217486 | A1 | 8/2010 | Taguchi | |

FOREIGN PATENT DOCUMENTS

| | | |
|---|---|---|
| JP | 10338110 A | 12/1998 |
| JP | 2006096157 A | 4/2006 |
| JP | 2006123604 A | 5/2006 |
| JP | 2007001402 A | 1/2007 |
| JP | 2007-304880 A | 11/2007 |
| JP | 2007296915 A | 11/2007 |
| JP | 2008-162553 A | 7/2008 |
| JP | 2008-308025 A | 12/2008 |
| JP | 2009-096362 A | 5/2009 |
| JP | 2009-104543 A | 5/2009 |

* cited by examiner

*Primary Examiner* — Thomas Tarcza
*Assistant Examiner* — Tyler J Lee
(74) *Attorney, Agent, or Firm* — Gifford, Krass, Sprinkle, Anderson & Citkowski, P.C.

(57) ABSTRACT

A vehicle travel control apparatus that controls state of travel of a vehicle by adjusting output of the vehicle relative to amount of operation of an operation member includes: a vehicle travel state detection portion that detects the state of travel of the vehicle; and an output adjustment portion that, when the amount of operation of the operation member increases, adjusts degree of increase in the output of the vehicle to a degree that is greater if amount of increase in the amount of operation of the operating member is smaller, based on the state of travel of the vehicle, and that, when the amount of operation of the operation member decreases, adjusts degree of decrease in the output of the vehicle to a degree that is greater if the amount of decrease in the amount of operation is smaller, based on the state of travel of the vehicle.

20 Claims, 12 Drawing Sheets

VEHICLE TRAVEL CONTROL APPARATUS

INCORPORATION BY REFERENCE

The disclosure of Japanese Patent Application No. 2009-132238 filed on Jun. 1, 2009 including the specification, drawings and abstract is incorporated herein by reference in its entirety.

BACKGROUND OF THE INVENTION

1. Field of the Invention

The invention relates to a vehicle travel control apparatus which generate a travel route that a vehicle is to take and generate a velocity pattern according to the travel route, and which control the traveling of the vehicle on the basis of the travel route and the velocity pattern.

2. Description of the Related Art

A vehicle travel control apparatus that generates a target velocity pattern for a travel route of a vehicle, and controls the traveling of the vehicle on the basis of the velocity pattern is described in, for example, Japanese Patent Application Publication No. 2007-296915 (JP-A-2007-296915). In the case of alerting a driver by giving a reaction force to the accelerator pedal under a predetermined condition, an inter-vehicle distance maintenance assist apparatus described in JP-A-2007-296915 induces the driver's operation of an accelerator pedal so as to achieve an accelerator operation amount that makes it easy for the driver to feel the reaction force of the accelerator pedal, by changing the relation between the accelerator operation amount and the drive torque into a correspondence relation therebetween that is different from an ordinary correspondence relation therebetween. In this manner, the inter-vehicle distance maintenance assist apparatus securely alerts the driver by giving a reaction force to the accelerator pedal.

The inter-vehicle distance maintenance apparatus of JP-A-2007-296915, by altering the relation between the accelerator operation amount and the drive torque, is able to make it easy for a driver of the vehicle to feel reaction force of the accelerator pedal, and is able to induce the driver to perform an accelerator pedal operation, and to maintain a proper inter-vehicle distance to a preceding vehicle. In this case, by making it easy for the driver to feel reaction force of the accelerator pedal, the apparatus induces a desirable state in which the inter-vehicle distance between the host vehicle and a preceding vehicle is a proper inter-vehicle distance. On the other hand, when the host vehicle is in an undesirable state, it is necessary to evade the undesirable state of the host vehicle. However, the inter-vehicle distance maintenance apparatus of JP-A-2007-296915 is not able to evade an undesirable state of the host vehicle.

SUMMARY OF THE INVENTION

The invention provides a vehicle travel control apparatus that lessens the burden on the driver of a vehicle by performing a proper travel assist, and improves travel safety by evading an undesirable state of travel of the vehicle.

A vehicle travel control apparatus in accordance with an aspect of the invention is a vehicle travel control apparatus that controls state of travel of a vehicle by adjusting output of the vehicle relative to amount of operation of an operation member includes: a vehicle travel state detection portion that detects the state of travel of the vehicle; and an output adjustment portion that, when the amount of operation of the operation member increases, adjusts degree of increase in the output of the vehicle to a degree that is greater if amount of increase in the amount of operation of the operating member is smaller, based on the state of travel of the vehicle, and that, when the amount of operation of the operation member decreases, adjusts degree of decrease in the output of the vehicle to a degree that is greater if the amount of decrease in the amount of operation is smaller, based on the state of travel of the vehicle.

According to the foregoing aspect of the invention, the vehicle travel control apparatus includes the output adjustment portion which, when the amount of operation of the operation member increases, adjusts the degree of increase in the output of the vehicle to a degree that is greater the smaller the amount of increase in the amount of operation, on the basis of the state of travel of the vehicle, and which, when the amount of operation of the operation member decreases, adjusts the degree of decrease in the output of the vehicle to a degree that is greater the smaller the amount of decrease in the amount of operation, on the basis of the state of travel of the vehicle. Hence, the vehicle travel control apparatus is able to lessen the burden on the driver of the vehicle by performing a proper travel assist, and is able to improve travel safety by evading an undesirable state of travel of the vehicle.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Hereinafter, embodiments of the vehicle travel control apparatus of the invention will be described in detail with reference to the drawings. Incidentally, it is to be noted that the following embodiments do not limit the invention.

Figure 1:
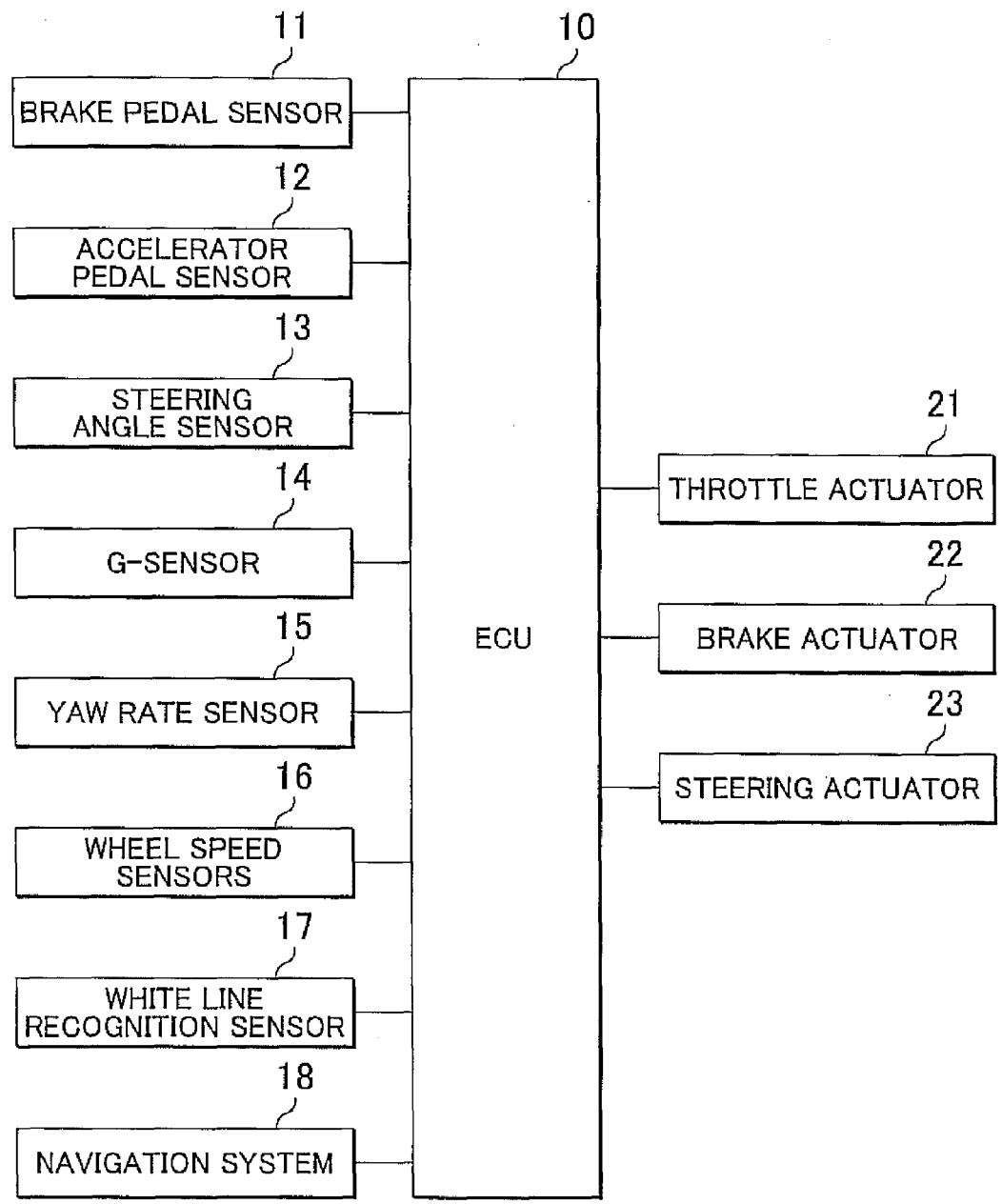
FIG. 1 is a general construction diagram representing a vehicle travel control apparatus in accordance with a first embodiment of the invention.
Figure 2:
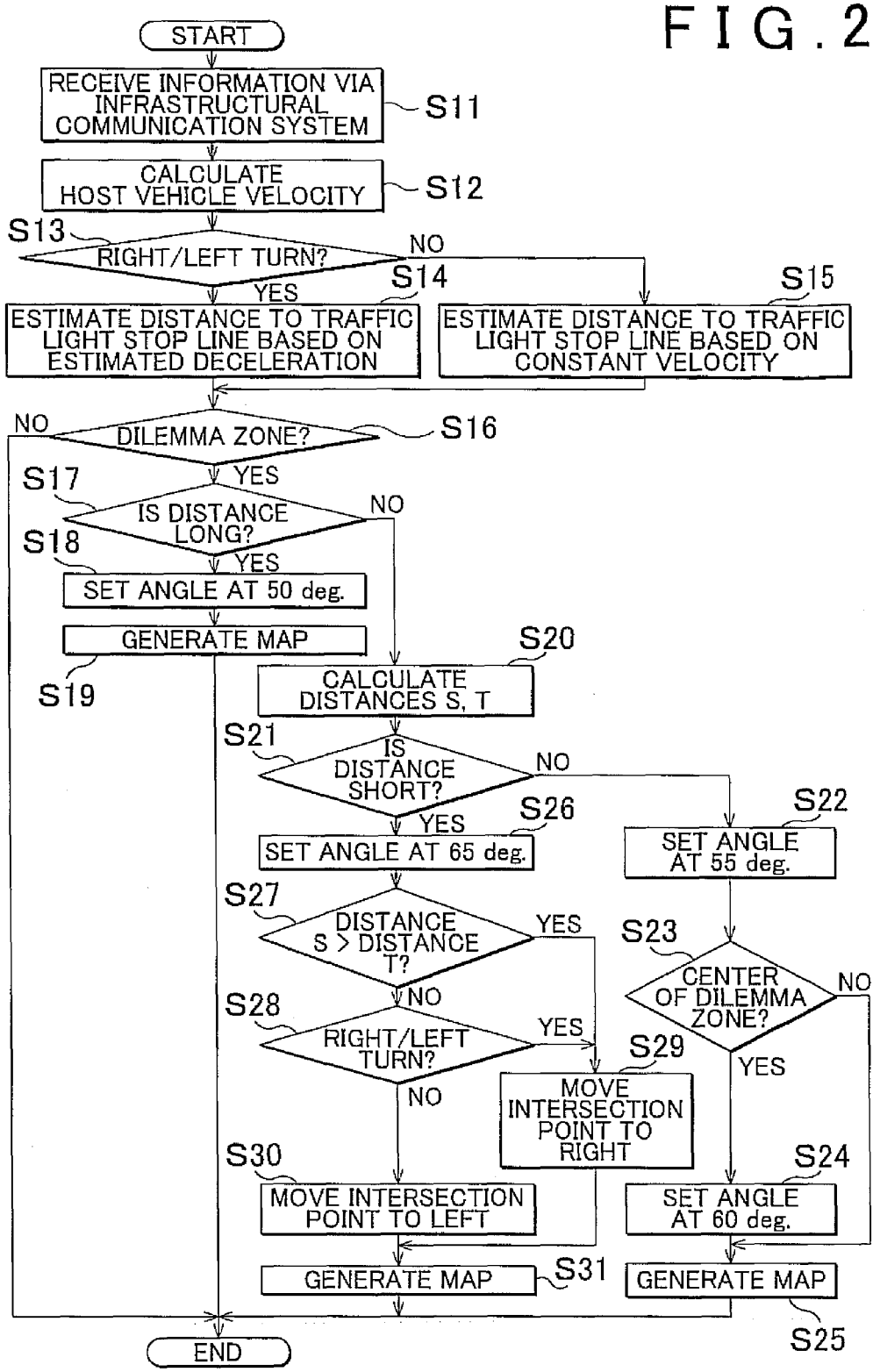
FIG. 2 is a flowchart for generating an acceleration/deceleration-correspondent map in the vehicle travel control apparatus of the first embodiment.
Figure 3:
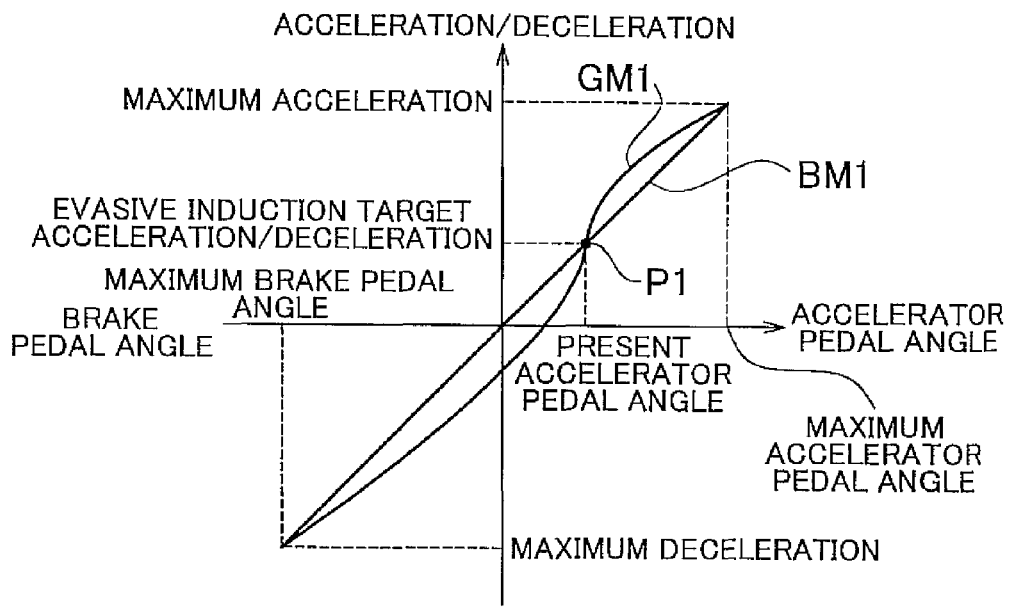
FIG. 3 is a graph representing the acceleration/deceleration-correspondent map used in the vehicle travel control apparatus of the first embodiment.

FIG. 1 is a general construction diagram representing a vehicle travel control apparatus in accordance with a first embodiment of the invention. FIG. 2 is a flowchart for generating an acceleration/deceleration-correspondent map in the vehicle travel control apparatus of the first embodiment. FIG. 3 is a graph representing the acceleration/deceleration-correspondent map used in the vehicle travel control apparatus of the first embodiment.

In the vehicle travel control apparatus of the first embodiment, as shown in FIG. 1, an electronic control unit (ECU) 10 is connected to a brake pedal sensor 11, an accelerator pedal sensor 12, a steering angle sensor 13, a G (acceleration)-sensor 14, a yaw rate sensor 15, wheel speed sensors 16, a white line recognition sensor 17, and a navigation system 18.

The brake pedal sensor 11 detects the amount of depression of a brake pedal that is depressed by a driver of a vehicle (i.e., the brake pedal stroke or depression force), and outputs the detected amount of depression of the brake pedal to the ECU 10. The accelerator pedal sensor 12 detects the amount of depression of an accelerator pedal that is depressed by the driver (i.e., the accelerator operation amount), and outputs the detected amount of depression of the accelerator pedal to the ECU 10. The steering angle sensor 13 detects the steering angle of the steering handle (wheel) that is operated by the driver, and outputs the detected steering angle to the ECU 10.

The G (acceleration)-sensor 14 detects the longitudinal acceleration and the lateral acceleration that act on the vehicle, and outputs the detected accelerations to the ECU 10. The yaw rate sensor 15 detects the yaw rate (lateral turning speed), and outputs the detected yaw rate to the ECU 10. The wheel speed sensors 16 are provided for each of four wheels of the vehicle. Each sensor detects the rotation speed of a corresponding one of the wheels, and outputs the detected rotation speed of the wheel to the ECU 10. The ECU 10 calculates the vehicle speed on the basis of the rotation speeds of the wheels.

The white line recognition sensor 17 has a camera and an image processing device, and detects white lines on the left and right sides of a vehicle-cruising lane, and outputs the detected positions (coordinates) of the left and right white lines to the ECU 10. From the positions of the left and right white lines, the ECU 10 calculates a line that passes through the center of the vehicle (a vehicle central line), the radius of curvature of the vehicle center line, and the like. The navigation system 18 performs detection of the present position of the vehicle, the route guidance to a destination, etc. In particular, this navigation system 18 reads from a map database the configuration of the road on which the vehicle is presently traveling, and outputs the road configuration information to the ECU 10.

The ECU 10 is also connected to a throttle actuator 21, a brake actuator 22, and a steering actuator 23.

The throttle actuator 21 opens and closes a throttle valve of an electronic throttle device, and adjusts the degree of throttle opening of the throttle valve. The ECU 10 operates the throttle actuator 21 so as to adjust the degree of opening of the throttle valve according to an engine control signal. The brake actuator 22 adjusts the control hydraulic pressure to a wheel cylinder that is provided in a brake device. The ECU 10 operates the brake actuator 22 so as to adjust the brake hydraulic pressure of the wheel cylinder according to a brake control signal. The steering actuator 23 gives as a steering torque a rotation drive force provided by an electric motor to a steering mechanism via a speed reduction mechanism. The ECU 10 operates the steering actuator 23 so as to adjust the steering torque via the electric motor according to a steering control signal.

By the way, when the driving or traveling of a vehicle is assisted so that the vehicle travels along a road that has a certain configuration, a target travel route and a velocity pattern are set by taking into account fuel economy, passage time, safety, etc., according to the road configuration. In this case, the target travel route is a travel route along which the vehicle is about to travel. This target travel route includes many parameters that are needed for the traveling of the vehicle, such as the position of the vehicle, the vehicle speed, the acceleration, the yaw rate, etc.

In this case, the ECU 10 sets an induction target acceleration/deceleration that is a target value of the acceleration/deceleration of the vehicle to which the vehicle is induced at every interval of a time during which the state of travel of the vehicle varies, and adjusts the present acceleration and deceleration of the vehicle by controlling the throttle actuator 21, the brake actuator 22 and the steering actuator 23 so that the state of travel of the vehicle has the set induction target acceleration/deceleration.

The vehicle travel control apparatus of the first embodiment controls the state of travel of the vehicle by adjusting the output of the vehicle relative to the amount of operation of an operation member, and includes a vehicle travel state detection portion that detects the state of travel of the vehicle, and an output adjustment portion which adjusts the degree of increase of the output of the vehicle to a degree that is greater the smaller the amount of increase in the amount of operation of the operation member is, on the basis of the state of travel of the vehicle, when the amount of operation of the operation member increases, and which adjusts the degree of decrease of the output of the vehicle to a degree that is greater the smaller the amount of decrease in the amount of operation of the operation member is, on the basis of the state of travel of the vehicle, when the amount of operation thereof decreases.

In this case, the vehicle travel state detection portion has a vehicle entrance prediction portion that predicts entrance of the vehicle into a region that is undesirable to the driver of the vehicle, on the basis of the state of travel of the vehicle. The output adjustment portion adjusts the output of the vehicle so as to evade the entrance of the vehicle into the region that is undesirable to the driver. That is, the output adjustment portion alters the degree of increase or the degree of decrease in the output of the vehicle relative to the amount of operation of an accelerator pedal 12 as an operation member, and makes such alteration that the degree of increase or the degree of decrease in the output relative to the amount of operation of the accelerator pedal increases. It is to be noted herein that the "region that is undesirable to the driver" is a region in which the difficulty of the travel control is high and the possibility of resulting in a risky driving is high.

Concretely, the output adjustment portion alters the degree of increase or the degree of decrease in the output of the vehicle relative to the amount of operation of the accelerator pedal 12 to a degree that is greater the shorter the distance from present traveling position of the vehicle to the undesirable region.

Besides, the output adjustment portion alters the degree of increase or the degree of decrease in the output of the vehicle relative to the amount of operation of the accelerator pedal 12 to a degree that is greater the nearer the position of the entrance of the vehicle into the undesirable region is to a central position in the undesirable region.

Besides, when the position of the entrance of the vehicle into the undesirable region is comparatively near to a possible-to-pass position at which the vehicle can pass a certain line while the vehicle is allowed to pass the line, with reference to the undesirable region, the output adjustment portion increases the degree of increase in the output of the vehicle relative to the amount of operation of the accelerator pedal 12. When the position of the entrance of the vehicle into the undesirable region is comparatively near to a possible-to-stop position at which the vehicle can stop at the foregoing line when the vehicle is required to stop at the line, with reference to the undesirable region, the output adjustment portion increases the degree of decrease in the output of the vehicle relative to the amount of operation of the accelerator pedal.

Furthermore, the output adjustment portion has a basic map in which a target acceleration is set according to the amount of operation of the accelerator pedal 12. When an evasive induction target acceleration that is a target acceleration that is to be evaded in order to avoid the entrance of the vehicle into the undesirable region is set according to the state of travel of the vehicle, the output adjustment portion generates an induction map by correcting the basic map so that the amount of change in the acceleration commensurate with an operation change amount that is the amount of change that occurs regarding the accelerator pedal 12 when the accelerator pedal 12 is operated increases in a predetermined range that contains the amount of operation of the accelerator pedal 12 that corresponds to the evasive induction target acceleration.

In this embodiment, the region undesirable to the driver is a dilemma zone which is defined by a possible-to-stop curve that represents the velocity of the vehicle at the time of start of a yellow traffic light and the distance from the position of the vehicle at the start of the yellow traffic light to a traffic light stop line in the case where the stop position at which the vehicle is expected to stop after decelerating coincides with the traffic light stop line, and a possible-to-pass straight line that represents the vehicle velocity at the time of start of the yellow traffic light and the distance from the position of the vehicle at the start of the yellow traffic light to the traffic light stop line in the case where the vehicle is expected to pass the traffic light stop line when the traffic light changes from the yellow light to the red light, and in which it is impossible for the vehicle to stop at the traffic light stop line after the yellow traffic light starts, and it is also impossible for the vehicle to pass the traffic light stop line before the traffic light switches to red.

Incidentally, in this embodiment, the operation member is the accelerator pedal 12. Besides, the vehicle travel state detection portion and the vehicle entrance prediction portion, whose functions are performed by the ECU 10, execute various processes. Furthermore, the output adjustment portion that adjusts the output of the vehicle so as to evade the entrance of the vehicle into the region undesirable to the driver includes the ECU 10 as well as the throttle actuator 21, the brake actuator 22 and the steering actuator 23.

The vehicle travel control apparatus of the first embodiment will be concretely described. The vehicle travel control apparatus of the first embodiment, through the use of the navigation system 18, reads from the map database the road configuration of a course along which the vehicle is going to travel, and sets a target travel route, and generates a velocity pattern commensurate with the target travel route. Then, the vehicle travel control apparatus sets an induction target acceleration/deceleration on the basis of the generated velocity pattern. Using this induction target acceleration/deceleration, the apparatus generates an acceleration/deceleration-correspondent map (induction map). Then, on the basis of the velocity pattern and the acceleration/deceleration-correspondent map, the vehicle travel control apparatus drives the throttle actuator 21, the brake actuator 22 and the steering actuator 23 to control the traveling of the vehicle so that the present acceleration/deceleration becomes equal to the target acceleration/deceleration.

Besides, when the vehicle comes to face a traffic light while traveling, the vehicle enters a so-called optional zone or a so-called dilemma zone. The dilemma zone refers to a region in which a vehicle facing a yellow traffic light will pass the traffic light or the stop line after the light turns to red, which means a neglect of traffic signal, if the vehicle continues traveling at the present velocity, or will stop within the intersection if the vehicle stops through ordinary deceleration caused by applying the brake. On the other hand, the optional zone refers to a region in which a vehicle facing a yellow traffic light can enter the intersection before the light turns to red, if the vehicle continues travelling at the present velocity, or can stop at the stop line if the vehicle stops through ordinary deceleration caused by applying the brake.

Figure 4:
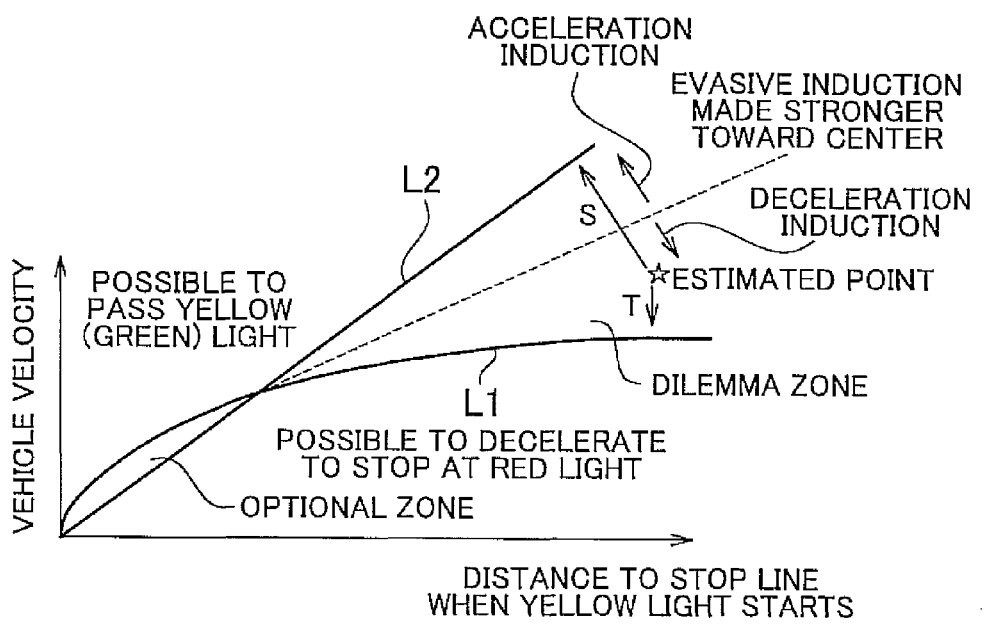
FIG. 4 is a graph for illustrating an optional zone and a dilemma zone during a travel of a vehicle.

In a graph as shown in FIG. 4 which represents the vehicle velocity relative to the distance to a stop line when the yellow light starts, there are drawn a curve L1 that shows the velocity of a vehicle and the position thereof relative to the stop line which have such a relation that the stop position at which the vehicle traveling at the velocity at the position is expected to stop if the vehicle begins to decelerate at ordinary deceleration coincides with the stop line, that is, the velocity and the position of the vehicle from which the vehicle is expected to stop exactly at the stop line if the vehicle begins to decelerate at ordinary deceleration, and a straight line L2 that shows the velocity and the position of the vehicle from which the vehicle, if continuing to travel at the same velocity, is expected to pass the stop line at the time point when the traffic light switches from yellow to red. With respect to the curve L1 and the straight line L2 as borders, a region thereabove is a zone in which the vehicle can pass the stop line while the yellow (or green) light is on, and a region therebelow is a zone in which the vehicle can stop at the stop line for the red light. Besides, the regions defined between the curve L1 and the straight line L2 are the optional zone and the dilemma zone.

In the first embodiment, the acceleration/deceleration-correspondent map is generated so as to theoretically have reaction force against the dilemma zone. That is, an acceleration/deceleration-correspondent map is generated such that if an induction target acceleration/deceleration results in the dilemma zone, the induction target acceleration/deceleration is set as an evasive induction target acceleration/deceleration, and the vehicle is less likely to have the evasive induction target acceleration/deceleration. Then, the acceleration/deceleration of the vehicle is induced into the zone in which the vehicle is able to stop at the stop line, or into the zone in which the vehicle is able to pass the stop line while the traffic light is yellow. At this time, the average acceleration/deceleration of the host vehicle is used to predict entrance into the dilemma zone, and the induction is made stronger the shorter the distance to the stop line, and the induction is made relatively strong with regard to the entrance into the dilemma zone toward the center thereof. Besides, when the vehicle turns right or left, the induction is performed to the deceleration side rather than to the acceleration side.

A technique of generating an acceleration/deceleration-correspondent map will be described. Concretely, the vehicle travel control apparatus firstly generates a basic map BM1 for setting a target acceleration/deceleration that corresponds to the accelerator pedal angle and the brake pedal angle, as shown in FIG. 3. In the diagram of FIG. 3, the horizontal axis represents the amount of operation of the accelerator pedal (the accelerator pedal angle) and the amount of operation of the brake pedal (the brake pedal angle), and the vertical axis represents the acceleration/deceleration of the vehicle (the acceleration on the positive side, and the deceleration on the negative side). Incidentally, in the following description, the amount of depression of the accelerator pedal caused by the driver, that is, the amount of operation of the accelerator pedal (the accelerator operation amount), is termed the accelerator pedal angle, and the amount of depression of the brake pedal caused by the driver, that is, the amount of operation of the brake pedal (the brake pedal stroke, or the depression force), is termed the brake pedal angle. In this basic map BM1, as the amount of operation changes from the maximum brake pedal angle to the maximum accelerator pedal angle, the acceleration/deceleration changes from the maximum deceleration to the maximum acceleration through 0, uniformly at a gradient angle of 45 degrees.

Next, after an evasive induction target acceleration/deceleration is set on the basis of the state of operation of the vehicle (the present accelerator pedal angle and the dilemma zone), the vehicle travel control apparatus finds the intersection point P1 of the basic map BM1 and the induction target acceleration/deceleration. Then, from the basic map BM1, an acceleration/deceleration-correspondent map GM1 that passes through the intersection point P1 is generated such that in the vicinity of the evasive induction target acceleration/deceleration, the amount of change in the acceleration/deceleration increases relative to the amount of change in the amount of operation (the accelerator pedal angle or the brake pedal angle). That is, in the acceleration/deceleration-correspondent map GM1, as the amount of operation changes from the maximum brake pedal angle to the maximum accelerator pedal angle, the amount of change in the acceleration/deceleration varies at any point from the maximum deceleration to the maximum acceleration through the intersection point P1. Concretely, the gradient angle of the acceleration/deceleration-correspondent map GM1 at the intersection point P1 is larger than 45 degree and smaller than 90 degrees. In a range of the amount of operation that is smaller than the amount of operation given at the intersection point P1, the acceleration/deceleration-correspondent map GM1 is positioned below the basic map BM1, whereas in a range of the amount of operation larger than the amount of operation given at the intersection point P1, the acceleration/deceleration-correspondent map GM1 is above the basic map BM1.

On this acceleration/deceleration-correspondent map GM1, the acceleration/deceleration of the vehicle changes conspicuously relative to changes in the amount of operation (the accelerator pedal angle or the brake pedal angle) when the acceleration/deceleration is in the vicinity of the evasive induction target acceleration/deceleration. In particular, the closer to 90 degrees the gradient angle of the acceleration/deceleration-correspondent map GM1 at the intersection point P1, the greater the amount of change in the acceleration/deceleration relative to the amount of change in the amount of operation (the accelerator pedal angle or the brake pedal angle). Therefore, in the vicinity of the evasive induction target acceleration/deceleration, it becomes harder to maintain the acceleration/deceleration at this evasive induction target acceleration/deceleration, so that it readily becomes hard to maintain the evasive induction target acceleration/deceleration even through the driver's operation of the accelerator pedal or the brake pedal. That is, it becomes less likely that the vehicle enters the dilemma zone.

After the acceleration/deceleration-correspondent map GM1 is generated in the foregoing manner, the ECU 10 acquires the amount of depression of the brake pedal (the brake pedal angle) from the brake pedal sensor 11, and the amount of depression of the accelerator pedal (the accelerator pedal angle) from the accelerator pedal sensor 12, and extracts an acceleration/deceleration from the acceleration/deceleration-correspondent map GM1 on the basis of the brake pedal angle or the accelerator pedal angle, and sets the extracted acceleration/deceleration as a target acceleration/deceleration. On another hand, the ECU 10 acquires the rotation speeds of the wheels from the wheel speed sensors 16, and calculates a vehicle speed from the rotation speeds of the wheels, and further calculates the actual acceleration/deceleration of the vehicle. Then, the ECU 10 compares the target acceleration/deceleration and the actual acceleration/deceleration, and controls the throttle actuator 21, the brake actuator 22 and the steering actuator 23 so that the difference between the target and actual values decreases.

Herein, a process of generating the acceleration/deceleration-correspondent map in the vehicle travel control apparatus of the first embodiment will be described in detail with reference to the flowchart of FIG. 2.

As shown in FIG. 2, in step S11 in the generation process for an acceleration/deceleration-correspondent map in the vehicle travel control apparatus of the first embodiment, the vehicle travel control apparatus reads the road configuration of a course along which the vehicle is going to travel, from the map database via the navigation system 18 through the use of the infrastructure, and sets a target travel route, and generates a velocity pattern commensurate with the set target travel route. Then, the vehicle travel control apparatus receives information regarding the switching of the traffic light, and the process ends at the time point at the time point when the vehicle reaches a position that allows the vehicle to receive the information. In step S12, acquiring the rotation speeds of the four wheels of the vehicle detected by the wheel speed sensors 16, the ECU 10 calculates the vehicle speed of the host vehicle on the basis of the rotation speeds of the wheels.

In step S13, it is determined whether or not the vehicle is going to turn right or left on the basis of the set travel route or the operation of the blinker or direction indicator. If in this step it is determined that the vehicle is going to turn right or left, the distance to the traffic light stop line from the position of the vehicle at the planned start time of the yellow light is estimated from an estimated deceleration of the vehicle and the present traveling position of the vehicle, in step S14. The estimated deceleration is a deceleration that is estimated through the learning control of the decelerations stored when the vehicle turns right or left. On the other hand, if it is determined that the vehicle is not going to turn right or left, the distance to the traffic light stop line from the position of the vehicle at the planned start time of the yellow light is estimated from the present velocity and the present traveling position of the vehicle on the assumption that the present vehicle velocity continues, in step S15.

In step S16, it is determined whether or not the vehicle is going to enter the dilemma zone. This determination is made by setting the curve L1 that shows the velocity of a vehicle and the position of the vehicle relative to the stop line which have such a relation that the stop position at which the vehicle traveling at the velocity and at the position is expected to stop if the vehicle begins to decelerate at ordinary deceleration coincides with the stop line, that is, the velocity and the position of the vehicle from which the vehicle is expected to stop exactly at the stop line if the vehicle begins to decelerate at ordinary deceleration, and the straight line L2 that shows the velocity and the position of the vehicle from which the vehicle, if continuing to travel at the same velocity, is expected to pass the stop line at the time point when the traffic light switches from yellow to red, as shown in FIG. 4, and then finding the position of the vehicle in the graph in FIG. 4 on the basis of the present velocity of the vehicle and the estimated distance thereof to the traffic light stop line.

If in step S16 it is determined that the vehicle is not going to enter the dilemma zone, the ECU 10 ends this routine without performing any further operation. On the other hand, if it is determined that the vehicle is going to enter the dilemma zone, it is then determined in step S17 whether or not the distance from the present position of the vehicle to the stop line is long (e.g., longer than or equal to 100 m). If in this step it is determined that the distance to the stop line is long, the process proceeds to step S18, in which in order to generate an acceleration/deceleration-correspondent map GM1, the gradient of the acceleration/deceleration-correspondent map GM1 at the intersection point P1 between the basic map BM1 and the evasive induction target acceleration/deceleration is set at an angle (e.g., 50 degrees) that is slightly steeper than the gradient angle (45 degrees) of the basic map BM1. Then, in step S19, the acceleration/deceleration-correspondent map GM1 is generated by applying the gradient set in step S18.

That is, as shown in FIG. 3, a basic map BM1 that sets a target deceleration of the vehicle relative to the accelerator pedal angle and the brake pedal angle is generated, and an evasive induction target acceleration/deceleration is set on the basis of the state of operation of the vehicle. Then, an intersection point P1 between the basic map BM1 and the induction target acceleration/deceleration is found. Then, using the set gradient at the intersection point P1, an acceleration/deceleration-correspondent map GM1 is generated. As a result, the acceleration/deceleration-correspondent map GM1 is set such that in the vicinity of the evasive induction target acceleration/deceleration, the amount of change in the acceleration/deceleration relative to the amount of change in the accelerator pedal angle and the brake pedal angle is great (is sensed to a great degree), in comparison with the basic map BM1. Then, after the acceleration/deceleration-correspondent map GM1 is generated, the process is ended.

On the other hand, if in step S17 it is determined that the distance from the present position of the vehicle to the stop line is not long, the process proceeds to step S20, in which on the basis of the present speed of the vehicle and the distance thereof to the traffic light stop line calculated in steps S12 to S15, the point of the vehicle in the dilemma zone in the graph is found, and the distance S from the point of the vehicle in the dilemma zone to the possible-to-stop curve L1, and the distance T therefrom to the possible-to-pass straight line L2 are calculated. That is, as shown by a dotted line in FIG. 4, when the vehicle enters the dilemma zone, the distance S from the point of the vehicle in the dilemma zone to the possible-to-stop curve L1, and the distance T therefrom to the possible-to-pass straight line L2 are found.

In step S21, it is determined whether or not the distance from the present position of the vehicle to the stop line is short (e.g., less than or equal to 50 m). If in this step it is determined that the distance to the stop line is not short (e.g., is 50 m to 100 m), the process proceeds to step S22, in which in order to generate an acceleration/deceleration-correspondent map GM1, the gradient of the acceleration/deceleration-correspondent map GM1 at the intersection point P1 between the basic map BM1 and the evasive induction target acceleration/deceleration is set at an angle (e.g., 55 degrees) that is steeper than the gradient angle (45 degrees) of the basic map BM1. Then, in step S23, it is determined whether or not the point of the vehicle in the dilemma zone, when the vehicle enters the dilemma zone, is at a central position in the zone (that is indicated by a dotted line in FIG. 4). In this step, minimum values of the distances S and T calculated in step S20 are calculated, and are compared with the half of the total value of the distances S and T, and if the following expression (1) is satisfied, it is determined that the vehicle is at the central position in the dilemma zone.

$$\min(S,T) > (S+T)/2 \tag{1}$$

If in this step it is determined that the vehicle is at the central position in the dilemma zone, the gradient of the acceleration/deceleration-correspondent map GM1 is set at an even steeper angle (e.g., 60 degrees) in step S24. After that, in step S25, an acceleration/deceleration-correspondent map GM1 is generated by applying the set gradient. Then, after the acceleration/deceleration-correspondent map GM1 is generated, this process ends.

On the other hand, if in step S21 it is determined that the distance from the present position of the vehicle to the stop line is short, the process proceeds to step S26, in which in order to generate an acceleration/deceleration-correspondent map GM1, the gradient of the acceleration/deceleration-correspondent map GM1 at the intersection point P1 between the basic map BM1 and the evasive induction target acceleration/deceleration is set at an angle (e.g., 65 degrees) that is considerably steeper than the gradient angle (45 degrees) of the basic map BM1. Then, in step S27, the distances S and T calculated in step S20 are compared to determine whether or not the distance S is greater than the distance T.

If in this step it is determined that the distance S is not greater than the distance T, it is then determined in step S28 whether or not the vehicle is going to turn right or left. If in step S27 it is determined that the distance S is greater than the distance T, or if in step S28 it is determined that the vehicle is going to turn right or left, the process proceeds to step S29, in which the position of the intersection point P1 on the acceleration/deceleration-correspondent map GM1 is moved rightward, that is, moved in such a direction that the accelerator pedal angle increases (e.g., by +10%) while the evasive induction target acceleration/deceleration is maintained. On the other hand, if in step S27 it is determined that the distance S is not greater than the distance T, or if in step S28 that the vehicle is not going to turn right or left, the process proceeds to step S30, in which the position of the intersection point P1 on the acceleration/deceleration-correspondent map GM1 is moved leftward, that is, moved in such a direction that the accelerator pedal angle decreases (e.g., by −10%) while the evasive induction target acceleration/deceleration is maintained.

That is, if it is determined that in FIG. 4, the point of the vehicle in the dilemma zone is to the possible-to-pass straight line L2 side from the central position in the dilemma zone (i.e., S<T), or if it is determined that the vehicle is not going to turn right or left, acceleration induction is executed. On the other hand, if the point of the vehicle in the dilemma zone is to the possible-to-stop curve L1 from the central position therein (i.e., S>T), or if it is determined that the vehicle is going to turn right or left, deceleration induction is executed.

After that, in step S31, an acceleration/deceleration-correspondent map GM1 is generated by applying the gradient set as described above. Then, after the acceleration/deceleration-correspondent map GM1 is generated, the process ends.

Thus, the vehicle travel control apparatus of the first embodiment includes the vehicle travel state detection portion that detects the state of travel of the vehicle, and the output adjustment portion which adjusts the degree of increase in the output of the vehicle to a degree that is greater the smaller the amount of increase in the amount of operation of the accelerator pedal, on the basis of the state of travel of the vehicle, when the amount of operation of the accelerator pedal increases, and which adjusts the degree of decrease in the output of the vehicle to a degree that is greater the smaller the amount of decrease in the amount of operation of the accelerator pedal, on the basis of the state of travel of the vehicle, when the amount of operation of the accelerator pedal decreases. Concretely, the vehicle travel state detection portion is a vehicle entrance prediction portion that predicts entrance of the vehicle into a region of traveling that is undesirable to the driver, on the basis of the state of travel of the vehicle, and the output adjustment portion adjusts the output of the vehicle so as to evade the entrance of the vehicle into the region of traveling that is undesirable to the driver.

Hence, from the state of travel of the vehicle, it is predicted whether or not the vehicle will enter a region of traveling that is undesirable to the driver (the dilemma zone in this embodiment). If it is predicted that the vehicle will enter the undesirable region of traveling, the output of the vehicle is adjusted so as to evade the entrance of the vehicle into the undesirable region. Thus, the burden on the driver can be lessened by performing a proper travel assist, and the travel safety can be improved by evading the undesirable state of travel of the vehicle.

Concretely, in the vehicle travel control apparatus of the first embodiment, the ECU 10 as the output adjustment portion alters the degree of increase or the degree of decrease in the output relative to the amount of operation of the accelerator pedal. That is, the ECU 10 makes such alteration that the degree of increase or the degree of decrease in the output of the vehicle relative to the amount of operation of the accelerator pedal becomes larger. Therefore, since the degree of increase or the degree of decrease in the output of the vehicle relative to a predetermined amount of operation of the accelerator pedal performed by the driver is altered to greater degree than usual, it becomes easy to evade the entrance of the vehicle into the dilemma zone.

Besides, in the vehicle travel control apparatus of the first embodiment, the degree of increase or the degree of decrease in the output of the vehicle relative to the amount of operation of the accelerator pedal is altered to a degree that is greater the shorter the distance from the present position of the vehicle to the dilemma zone. Therefore, when the vehicle comes very close to the dilemma zone, the degree of increase or the degree of decrease in the output of the vehicle relative to the amount of operation of the accelerator pedal is increased, so that it becomes possible to evade the entrance of the vehicle into the dilemma zone.

Besides, in the vehicle travel control apparatus of the first embodiment, the degree of increase or the degree of decrease in the output of the vehicle relative to the amount of operation of the accelerator pedal is altered to a degree that is greater the nearer to the central position in the dilemma zone the position of the entrance of the vehicle is. Hence, it becomes possible to properly evade the entrance of the vehicle into the dilemma zone.

Besides, in the vehicle travel control apparatus of the first embodiment, when the point of the entrance of the vehicle into the dilemma zone is comparatively near to a possible-to-pass point (the possible-to-pass straight line L2), the degree of increase in the output of the vehicle relative to the amount of operation of the accelerator pedal is altered to greater degree, and when the point of the entrance of the vehicle into the dilemma zone is comparative near to a possible-to-stop point (the possible-to-stop curve L1), the degree of decrease in the vehicle output relative to the amount of operation of the accelerator pedal is altered to greater degree. Hence, when the vehicle is likely to enter the dilemma zone, the point of traveling of the vehicle in the graph is induced to the possible-to-pass point or to the possible-to-stop point according to the present point of traveling of the vehicle, so that it becomes possible to effectively evade the entrance into the dilemma zone.

Besides, the vehicle travel control apparatus of the first embodiment has a basic map in which the target acceleration/deceleration is set according to the amount of operation of the accelerator pedal. When an evasive induction target acceleration/deceleration is set in accordance with the state of travel of the vehicle, the travel control apparatus generates an acceleration/deceleration-correspondent map (induction map) by correcting the basic map so that the amount of change in the acceleration/deceleration commensurate with the operation change amount of the accelerator pedal increases in a predetermined range that contains the amount of operation of the accelerator pedal that corresponds to the evasive induction target acceleration/deceleration. Hence, by altering the acceleration/deceleration-correspondent map according to the state of travel of the vehicle, the travel control of the vehicle can easily be performed.

Besides, in the vehicle travel control apparatus of the first embodiment, the region undesirable to the driver is the dilemma zone defined by the possible-to-stop curve that represents the velocity of the vehicle and the distance thereof to a traffic light stop line which have such a relation that the stop position at which the vehicle traveling at the velocity and at the distance is expected stop coincides with the stop line, that is, from which the vehicle is expected to stop exactly at the stop line if the vehicle decelerates at usual deceleration, and the possible-to-pass straight line that represents the velocity of the vehicle and the distance thereof to the traffic light stop line from which the vehicle, if continuing traveling at the same velocity, is expected to pass the stop line before the traffic light turns to red. Hence, the entrance of the vehicle into an intersection with the red light, or the stop of the vehicle within an intersection can be evaded, and therefore the travel safety of the vehicle can be improved.

Figure 5:
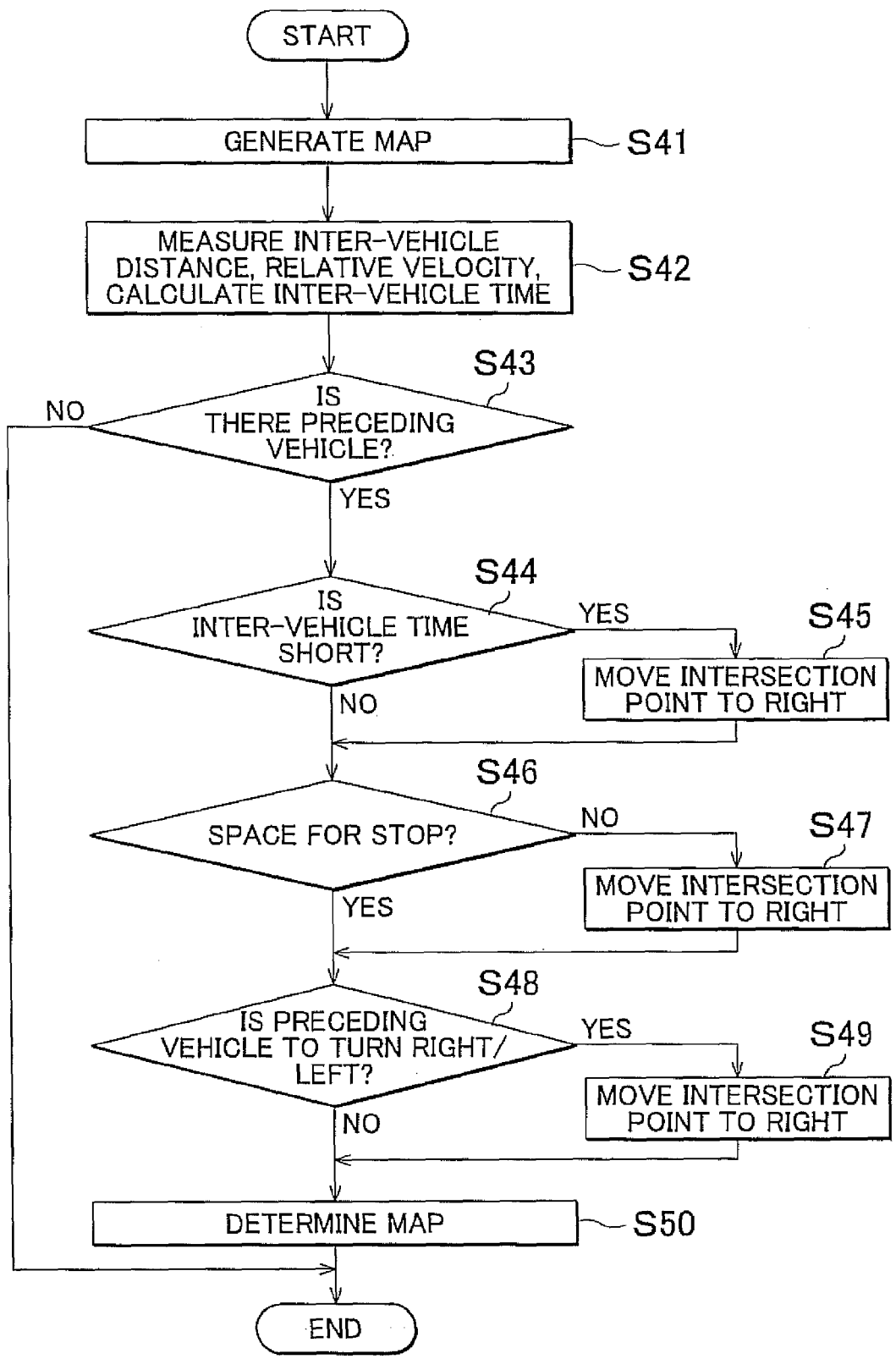
FIG. 5 is a flowchart for generating an acceleration/deceleration-correspondent map in a vehicle travel control apparatus in accordance with a second embodiment of the invention.

FIG. 5 is a flowchart for generating an acceleration/deceleration-correspondent map in a vehicle travel control apparatus in accordance with a second embodiment of the invention. The overall construction of the vehicle travel control apparatus of this embodiment is substantially the same as that of the foregoing first embodiment, and will be described with reference to FIG. 1 as well. The members and the like that have substantially the same functions as those described above in conjunction with the first embodiment are denoted by the same reference characters, and will not be described again below.

The vehicle travel control apparatus of the second embodiment, when there is a preceding vehicle, reduces the degree of increase in the output of the host vehicle relative to the amount of operation of the accelerator pedal, or increases the degree of decrease in the output of the vehicle relative to the amount of operation of the accelerator pedal.

The vehicle travel control apparatus of the second embodiment will be concretely described. As described above, the vehicle travel control apparatus of the first embodiment controls the traveling of the vehicle by driving the throttle actuator 21, the brake actuator 22 and the steering actuator 23 so that the present acceleration/deceleration of the vehicle becomes equal to the target acceleration/deceleration on the basis of the velocity pattern and the acceleration/deceleration-correspondent map. That is, the control apparatus of the first embodiment controls the traveling of the vehicle by adjusting the output of the host vehicle so that the vehicle does not enter the dilemma zone, regardless of the presence/absence of a preceding vehicle that precedes the host vehicle.

In the second embodiment, however, when a preceding vehicle exists, the host vehicle is induced to a side of deceleration. At this time, the induction is performed to the side of deceleration more strongly the shorter the inter-vehicle distance between the host vehicle and the preceding vehicle is, or the faster the relative velocity at which the host and preceding vehicles approach each other is. Besides, the induction is also performed strongly to the deceleration side when a preceding vehicle is stopped in an intersection due to congestion or the like.

A process of generating an acceleration/deceleration-correspondent map in the vehicle travel control apparatus of the second embodiment will be described in detail with reference to the flowchart shown in FIG. 5.

In step S41 in the generation process for the acceleration/deceleration-correspondent map in the vehicle travel control apparatus of the second embodiment, the foregoing generation process for the acceleration/deceleration-correspondent map in the first embodiment is executed as shown in FIG. 1 and FIG. 5. In step S42, the inter-vehicle distance to a preceding vehicle that travels in front of the host vehicle, and the relative velocity thereof are measured by a radar device that is mounted in the host vehicle. Then, the inter-vehicle time is calculated using the following expression (2).

$$\text{(inter-vehicle time)} = \text{(inter-vehicle distance)} / \text{(host vehicle velocity)} \quad (2)$$

In step S43, it is determined whether or not there exists a preceding vehicle. If in this step it is determined that there is no preceding vehicle, this routine is ended without performing any further operation. On the other hand, if it is determined that there is a preceding vehicle, it is then determined in step S44 whether or not the inter-vehicle time between the host vehicle and the preceding vehicle is shorter than a predetermined time (e.g., 1 second). If it is determined that the inter-vehicle time between the host vehicle and the preceding vehicle is shorter than the predetermined time, the position of the intersection point P1 on the acceleration/deceleration-correspondent map GM1 is moved rightward, that is, moved in such a direction that the accelerator pedal angle increases (e.g., by +10%) while the evasive induction target acceleration/deceleration is maintained, in step S45. That is, the acceleration/deceleration-correspondent map. GM1 is corrected to a deceleration induction map.

On the other hand, if in step S44 it is determined that the inter-vehicle time between the host vehicle and the preceding vehicle is greater than or equal to the predetermined time, it is then determined in step S46 whether or not a space for the host vehicle to stop exists before the stop line of an intersection. In this step, it is determined whether or not a preceding vehicle is stopped at the intersection due to traffic congestion. If it is determined that the space to stop the host vehicle does not exist before the stop line at the intersection, the position of the intersection point P1 on the acceleration/deceleration-correspondent map GM1 is moved rightward, that is, moved in such a direction that the accelerator pedal angle increases (e.g., +10%) while the evasive induction target acceleration/deceleration is maintained, in step S47. That is, the acceleration/deceleration-correspondent map GM1 is corrected to a deceleration induction map.

On the other hand, if in step S46 it is determined that a space for the host vehicle to stop exists before the stop line at the intersection, it is then determined in step S48 whether or not the preceding vehicle is going to turn right or left, on the basis of the picture taken by a forward shooting camera mounted in the host vehicle, or the vehicle-to-vehicle communication with the preceding vehicle. If in this step it is determined that the preceding vehicle is going to turn right or left, the position of the intersection point P1 on the acceleration/deceleration-correspondent map GM1 is moved rightward, that is, moved in such a direction that the accelerator pedal angle increases (e.g., for example, +10%) while the evasive induction target acceleration/deceleration is maintained, in step S49. That is, the acceleration/deceleration-correspondent map GM1 is corrected to a deceleration induction map.

On the other hand, if in step S48 it is determined whether or not the preceding vehicle is not going to turn right or left, the acceleration/deceleration-correspondent map GM1 is determined in step S50. After the acceleration/deceleration-correspondent map GM1 is thus determined, the process ends.

Incidentally, when the position of the intersection point P1 on the acceleration/deceleration-correspondent map GM1 is moved rightward, the maximum amount of movement thereof is 100% of the entire lateral width. In the case where the movement is 100% of the entire lateral width, the intersection point P1 comes to coincide with the maximum accelerator pedal angle, so that there will be no room for the acceleration/deceleration to rise from the intersection point P1.

Thus, in the vehicle travel control apparatus of the second embodiment, when a preceding vehicle exists in front of the host vehicle, the degree of increase in the output of the vehicle relative to the amount of operation of the accelerator pedal is reduced, or the degree of decrease in the output of the vehicle relative to the amount of operation of the accelerator pedal is increased. Hence, the acceleration of the vehicle is lessened, and indiscreet acceleration is restrained, so that undesirable approach to a preceding vehicle can be avoided.

Figure 6:
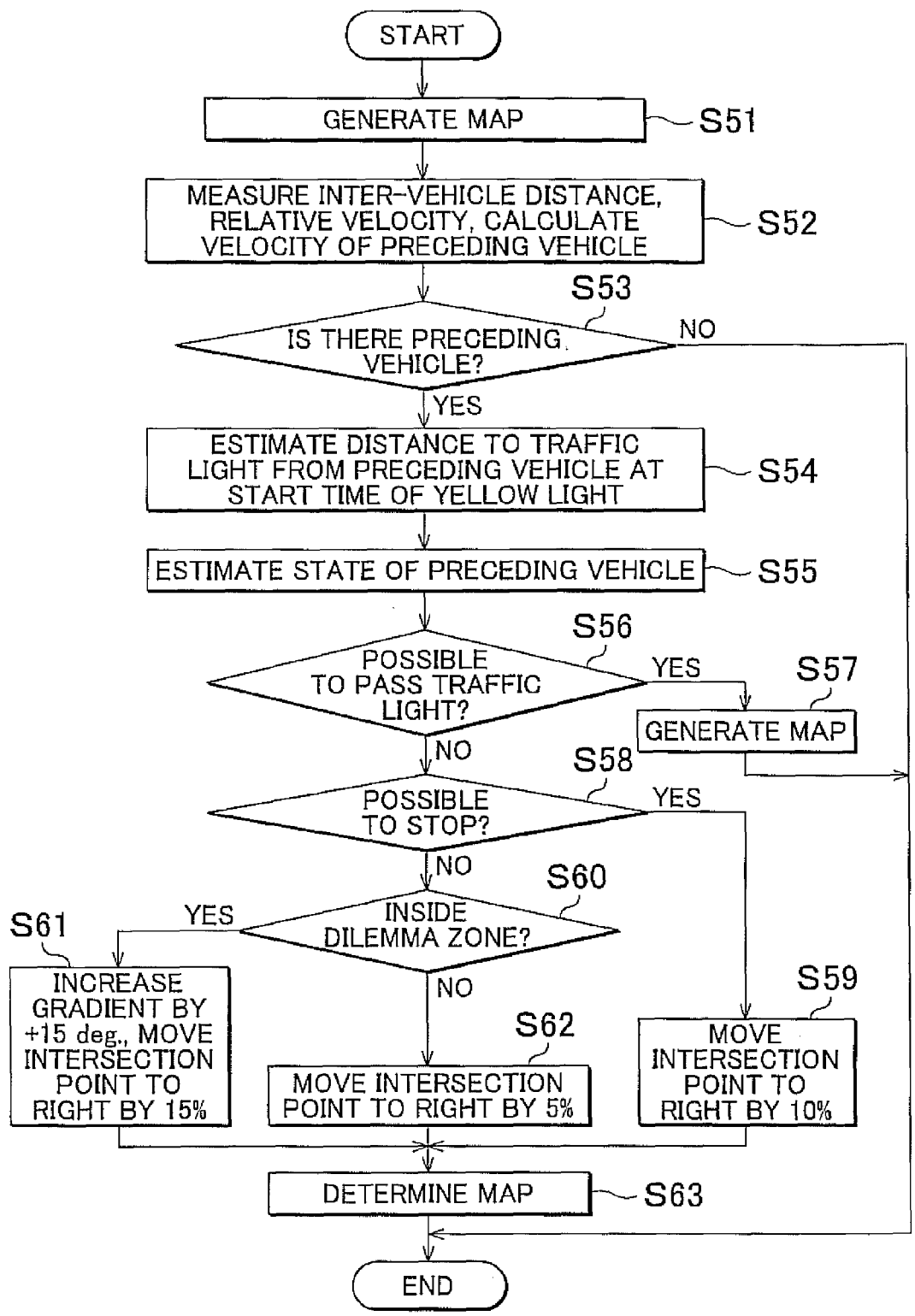
FIG. 6 is a flowchart for generating an acceleration/deceleration-correspondent map in a vehicle travel control apparatus in accordance with a third embodiment of the invention.

FIG. 6 is a flowchart for generating an acceleration/deceleration-correspondent map in a vehicle travel control apparatus in accordance with a third embodiment of the invention. The overall construction of the vehicle travel control apparatus of this embodiment is substantially the same as that of the foregoing first embodiment, and will be described with reference to FIG. 1 as well. The members and the like that have substantially the same functions as those described above in conjunction with the first embodiment are denoted by the same reference characters, and will not be described again below.

The vehicle travel control apparatus of the third embodiment alters the degree of increase or the degree of decrease in the output of the host vehicle relative to the amount of operation of the accelerator pedal on the basis of the positional relationship of a preceding vehicle to the dilemma zone.

The vehicle travel control apparatus of the third embodiment will be concretely described. For comparison, the vehicle travel control apparatus of the second embodiment adjusts the acceleration/deceleration of the host vehicle according to the distance between the host vehicle and a preceding vehicle that travels in front of the host vehicle. In this case, the induction of the host vehicle is adjusted on the basis of the inter-vehicle distance (inter-vehicle time) between the host vehicle and the preceding vehicle. This induction is proper when the host vehicle is traveling following the preceding vehicle. However, in the case where after the host vehicle catches up with the preceding vehicle, the driver of the host vehicle desires to pass over the preceding vehicle or the preceding vehicle slows down or stops, the induction in the second embodiment becomes rather inappropriate.

Therefore, in the third embodiment, the velocity of the preceding vehicle, the distance thereof to a traffic light, etc. are estimated in addition to the velocity of the host vehicle and the inter-vehicle distance to the preceding vehicle, and the state of entrance of the preceding vehicle into the pass-traffic-light region, the stop-at-traffic-light region, the dilemma zone or the optional zone is grasped. According to the grasped state of the preceding vehicle, the host vehicle is induced. Concretely, if the preceding vehicle is in the pass-traffic-light region, substantially the same process as in the second embodiment is performed. If the preceding vehicle is in the stop-at-traffic-light region, an induction process only to the deceleration side is performed. Besides, if the preceding vehicle is in the dilemma zone, a strong induction process only to the deceleration side is performed. If the preceding vehicle is in the optional zone, a weak induction process only to the deceleration side is performed.

A process of generating an acceleration/deceleration-correspondent map in the vehicle travel control apparatus of the third embodiment will be described in detail with reference to the flowchart of FIG. 6.

In the generation process for the acceleration/deceleration-correspondent map in the vehicle travel control apparatus of the third embodiment, the foregoing generation process for the acceleration/deceleration-correspondent map in the first embodiment is executed in step S51 as shown in FIG. 1 and FIG. 6. In step S52, the inter-vehicle distance between the host vehicle and a preceding vehicle that travels in front of the host vehicle, and the relative velocity of the preceding vehicle are measured by a radar device mounted in the host vehicle, and the inter-vehicle time is calculated by using the following expression (3).

(inter-vehicle time)=(inter-vehicle distance)/(host vehicle velocity)    (3)

In step S53, it is determined whether or not there is a preceding vehicle. If it is determined that there is no preceding vehicle, this routine is ended without performing any further operation. On the other hand, if it is determined that a preceding vehicle exists, the distance from the present traveling position of the preceding vehicle to a traffic light is calculated in step S54 by using the following expression (4).

(distance from the preceding vehicle to a traffic light)= (distance from the host vehicle to the traffic light)−(inter-vehicle distance)−(average vehicle length)    (4)

Then, the distance from the preceding vehicle to the traffic light stop line at the planned time of start of the yellow light in the case where the preceding vehicle continues to travel at the present velocity is estimated on the basis of the velocity of the preceding vehicle and the distance therefrom to the traffic light.

In step S55, the state of travel of the preceding vehicle is estimated. On the basis of the velocity of the preceding vehicle and the distance from the preceding vehicle to the traffic light, the determination as to whether or not the preceding vehicle is in the dilemma zone (step S16 in FIG. 2) in the first embodiment is executed. In step S56, it is determined whether or not it is possible for the preceding vehicle to pass the traffic light, on the basis of a result of the estimation in step S55. If it is determined that the preceding vehicle can pass through the traffic light, the foregoing generation process for the acceleration/deceleration-correspondent map in the second embodiment is executed in step S57.

On the other hand, if in step S56 it is determined that the preceding vehicle cannot pass the traffic light, it is then determined in step S58 whether or not the preceding vehicle can stop before the traffic light. If it is determined in this step that the preceding vehicle can stop before the traffic light, the process proceeds to step S59, in which the position of the intersection point P1 on the acceleration/deceleration-correspondent map GM1 is moved rightward, that is, moved in such a direction that the accelerator pedal angle increases (e.g., by +10%) while the evasive induction target acceleration/deceleration is maintained. That is, the acceleration/deceleration-correspondent map GM1 is corrected to a deceleration induction map. After that, the process proceeds to step S63.

On the other hand, if in step S58 it is determined that the preceding vehicle cannot stop before the traffic light, it is then determined in step S60 whether or not the vehicle is going to enter the dilemma zone. If in this step it is determined that the preceding vehicle is going to enter the dilemma zone, the process proceeds to step S61, in which in order to generate an acceleration/deceleration-correspondent map GM1, the gradient of the acceleration/deceleration-correspondent map GM1 at the intersection point P1 between the basic map BM1 and the evasive induction target acceleration/deceleration is set at an angle (e.g., 60 degrees) that is steeper than the gradient angle (45 degrees) of the basic map BM1, and the position of the intersection point P1 on the acceleration/deceleration-correspondent map GM1 is moved rightward, that is, moved in such a direction that the accelerator pedal angle increases (e.g., by +15%) while the evasive induction target acceleration/deceleration is maintained. That is, changes in the acceleration/deceleration at the intersection point P1 are caused to be sensitively perceived, and the acceleration/deceleration-correspondent map GM1 is corrected to a deceleration induction map. After that, the process proceeds to step S63.

On the other hand, if in step S60 it is determined that the vehicle is not going to enter the dilemma zone, the process proceeds to step S62, in which the position of the intersection point P1 on the acceleration/deceleration-correspondent map GM1 is moved rightward, that is, moved in such a direction that the accelerator pedal angle increases (e.g., +5%) while the evasive induction target acceleration/deceleration is maintained. That is, the acceleration/deceleration-correspondent map GM1 is corrected to a deceleration induction map. After that, the process proceeds to step S63. In step S63, the acceleration/deceleration-correspondent map GM1 is determined. After that, the process ends.

Thus, the vehicle travel control apparatus of the third embodiment alters the degree of increase or the degree of decrease in the output of the host vehicle relative to the amount of operation of the accelerator pedal on the basis of the positional relationship of the preceding vehicle to the dilemma zone. Therefore, by estimating whether or not a preceding vehicle is going to enter the dilemma zone, or considering whether the vehicle is going to pass through or stop at an intersection, the control apparatus is able to grasp a situation that cannot be predicted merely from the state of travel of the host vehicle, and makes it possible to perform an optimum induction of the vehicle commensurate with the behavior of the preceding vehicle.

Figure 7:
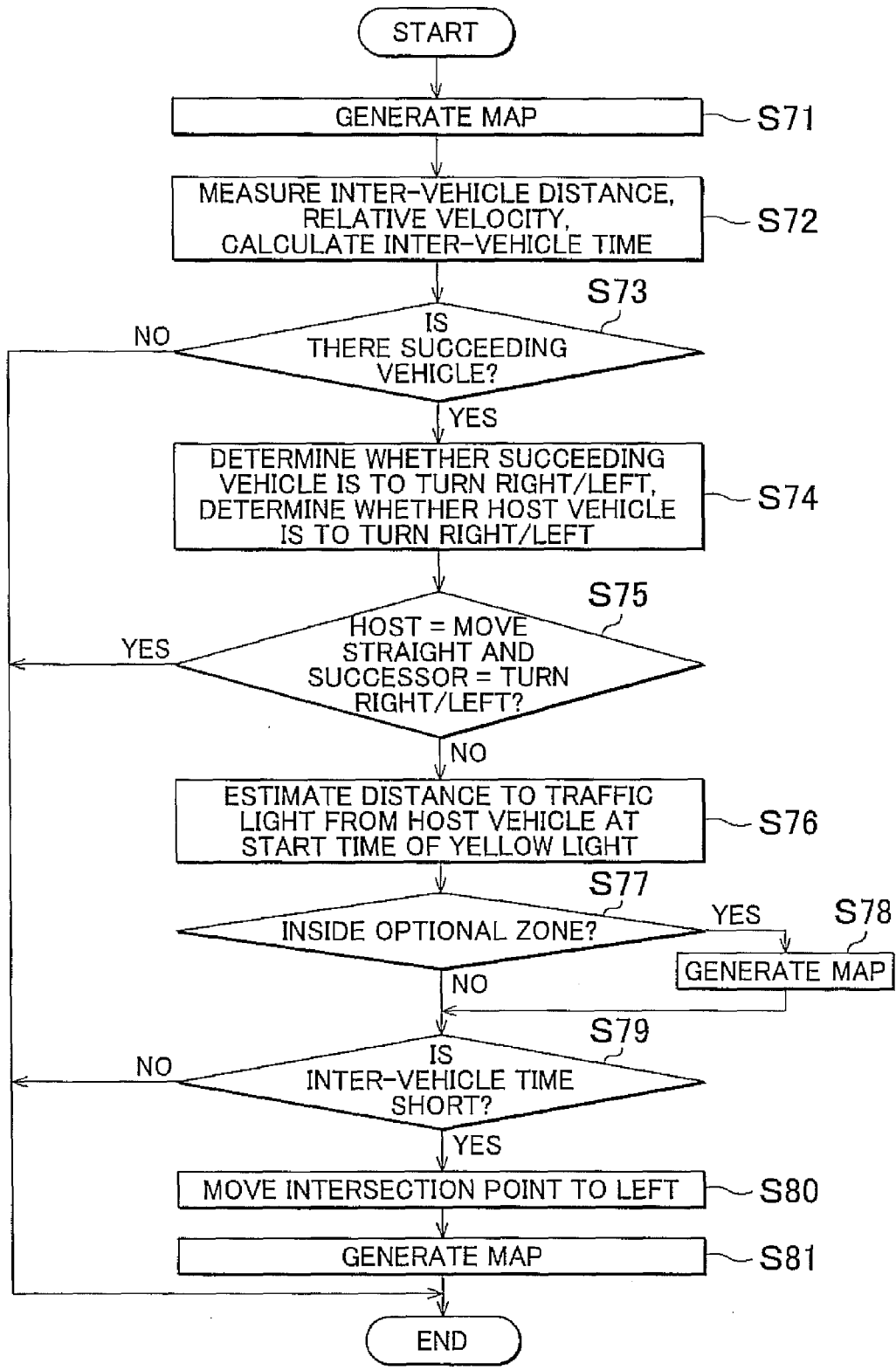
FIG. 7 is a flowchart for generating an acceleration/deceleration-correspondent map in a vehicle travel control apparatus in accordance with a fourth embodiment of the invention.

FIG. 7 is a flowchart for generating an acceleration/deceleration-correspondent map in a vehicle travel control apparatus in accordance with a fourth embodiment of the invention. The overall construction of the vehicle travel control apparatus of this embodiment is substantially the same as that of the foregoing first embodiment, and will be described with reference to FIG. 1 as well. The members and the like that have substantially the same functions as those described above in conjunction with the first embodiment are denoted by the same reference characters, and will not be redundantly described below.

In the vehicle travel control apparatus of the fourth embodiment, a region undesirable to the driver of the host vehicle when a succeeding vehicle exists behind the host vehicle the optional zone in which the distance of the traveling vehicle to the traffic light stop position is longer than in the dilemma zone, and which is defined by a possible-to-stop curve that represents the velocity of the vehicle at the time of start of a yellow traffic light and the distance from the position of the vehicle at the start of the yellow traffic light to the traffic light stop line in the case where the stop position at which the vehicle is expected to stop after decelerating coincides with the traffic light stop line, and a possible-to-pass straight line that represents the vehicle velocity at the time of start of the yellow traffic light and the distance from the position of the vehicle at the start of the yellow traffic light to the traffic light stop line in the case where the vehicle is expected to pass the traffic light stop line when the traffic light changes from the yellow light to the red light. The output adjustment portion adjusts the output of the vehicle so as to evade the entrance of the vehicle into the optional zone.

The vehicle travel control apparatus of the fourth embodiment will be concretely described. For comparison, the vehicle travel control apparatus of the first embodiment controls the traveling of the vehicle by driving the throttle actuator 21, the brake actuator 22 and the steering actuator 23 so that the present acceleration/deceleration of the vehicle becomes equal to a target acceleration/deceleration on the basis of the velocity pattern and the acceleration/deceleration-correspondent map. That is, the induction is performed so that the vehicle will not enter the dilemma zone, by adjusting the output of the vehicle regardless of whether or not a succeeding vehicle is present behind the host vehicle. Therefore, there is possibility that the induction of the vehicle may discomfort the driver or the like of the succeeding vehicle.

To overcome this, in the fourth embodiment, when a succeeding vehicle exists behind a host vehicle, the host vehicle is induced so as not to enter the optional zone since if the host vehicle is in the optional zone, it is not easy for the succeeding vehicle to grasp whether the host vehicle is going to pass the intersection (the yellow light), or stop at the intersection. Concretely, when the inter-vehicle distance between the host vehicle and the succeeding vehicle is short, the host vehicle is induced to accelerate and pass the intersection, and the succeeding vehicle is also allowed to pass the intersection. Besides, when the host vehicle travels straight through the intersection and the succeeding vehicle turns right or left, the acceleration induction of the host vehicle is not performed, since the possibility of rear-end collision is small.

The generation process for the acceleration/deceleration-correspondent map in the vehicle travel control apparatus of the fourth embodiment will be described in detail with reference to a flowchart shown in FIG. 7.

In step S71 in the generation process for the acceleration/deceleration-correspondent map in the vehicle travel control apparatus of the fourth embodiment, the foregoing generation process for the acceleration/deceleration-correspondent map in the first embodiment is executed as shown in FIG. 1 and FIG. 7. In step S72, the inter-vehicle distance between the host vehicle and a preceding vehicle that travels in front of the host vehicle, and the relative velocity thereof are measured by a radar device mounted in the host vehicle, and the inter-vehicle time is calculated by using the following expression (5).

$$\text{(inter-vehicle time)} = \text{(inter-vehicle distance)}/\text{(host vehicle velocity)} \quad (5)$$

In step S73, it is determined whether or not there is a succeeding vehicle. If it is determined that there is no succeeding vehicle, this routine is ended without performing any further operation. On the other hand, if it is determined that a preceding vehicle exists, it is then determined in step S74 whether or not the succeeding vehicle is going to turn right or left on the basis of a picture taken by a rearward shooting camera mounted in the host vehicle, or the vehicle-to-vehicle communication with the succeeding vehicle. Besides, it is also determined whether or not the host vehicle is going to turn right or left on the basis of the set travel route or the operation of the blinker.

If in step S75 it is determined that the succeeding vehicle is going to turn right or left and the host vehicle is not going to turn right or left (i.e., is going to move straight), it means that there is no risk of rear-end collision, and therefore the routine is ended without performing any further operation. On the other hand, if in this step it is determined that the succeeding vehicle is not going to turn right or left, it means that there is a risk of rear-end collision, regardless of the result of the determination as to whether the host vehicle is going to turn right or left. Therefore, in step S76, the distance to the traffic light stop line from the traveling position of the host vehicle at the planned time of start of the yellow light is estimated from the present traveling position of the host vehicle on the assumption that the present velocity of the host vehicle continues.

In step S77, it is determined whether or not the host vehicle is going to enter the optional zone. If in this step it is determined that the host vehicle is going to enter the optional zone, the process proceeds to step S78. In step S78, according to the distance to the traffic light stop line from the traveling position of the host vehicle at the planned time of start of the yellow light which is estimated from the present traveling position of the host vehicle, the gradient of the acceleration/deceleration-correspondent map GM1 at the intersection point P1 between the basic map BM1 and the evasive induction target acceleration/deceleration is set, and the acceleration/deceleration-correspondent map GM1 is generated by using this gradient, as in steps S17 to S31 in the first embodiment.

On the other hand, if in step S77 it is determined that the host vehicle is not going to enter the optional zone, it is then determined in step S79 whether or not the inter-vehicle time between the host vehicle and the succeeding vehicle is short (e.g., 1 second or less). If in this step it is determined that the inter-vehicle time between the host vehicle and the succeeding vehicle is short, the process proceeds to step S80, in which the position of the intersection point P1 on the acceleration/deceleration-correspondent map GM1 is moved leftward, that is, moved in such a direction that the accelerator pedal angle decreases (e.g., −5%) while the evasive induction target acceleration/deceleration is maintained. That is, the acceleration/deceleration-correspondent map GM1 is corrected to a velocity-increasing induction map. Then in step S81, the acceleration/deceleration-correspondent map GM1 is determined. After that, the process ends. On the other hand, if it is determined that the inter-vehicle time between the host vehicle and the succeeding vehicle is not short, the process immediately ends.

Thus, in the vehicle travel control apparatus of the fourth embodiment, when there is a succeeding vehicle, a region undesirable to the driver of the host vehicle is the optional zone, and the output of the host vehicle is adjusted so as to evade the entrance of the host vehicle into the optional zone. Hence, by altering the velocity of the host vehicle according to the presence/absence of a succeeding vehicle, the vehicle travel control apparatus is able to evade the approach of a succeeding vehicle to the host vehicle.

Figure 8:
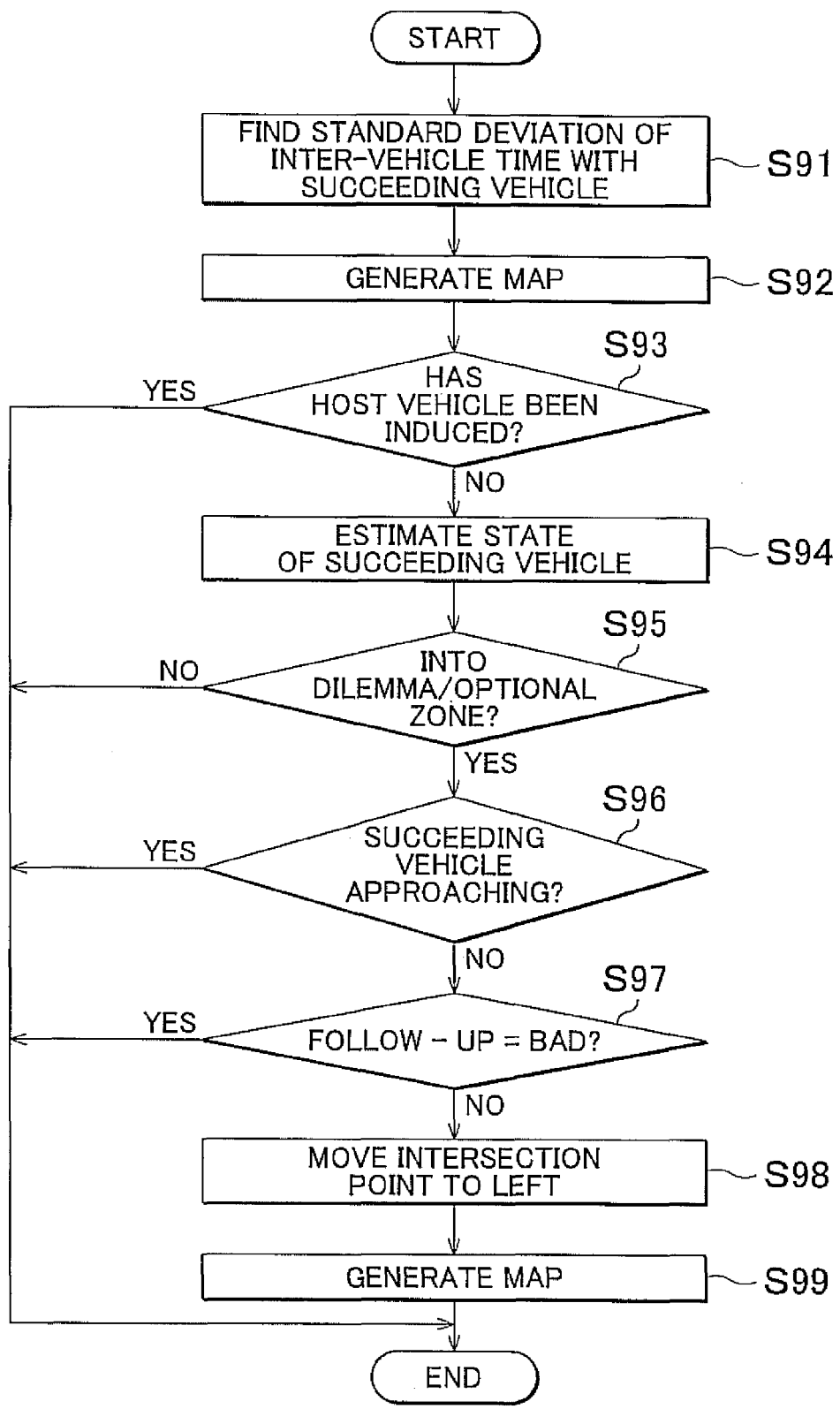
FIG. 8 is a flowchart for generating an acceleration/deceleration-correspondent map in a vehicle travel control apparatus in accordance with a fifth embodiment of the invention.

FIG. 8 is a flowchart for generating an acceleration/deceleration-correspondent map in a vehicle travel control apparatus in accordance with a fifth embodiment of the invention. Incidentally, the overall construction of the vehicle travel control apparatus of this embodiment is substantially the same as that of the foregoing first embodiment, and will be described with reference to FIG. 1 as well. The members and the like that have substantially the same functions as those described above in conjunction with the first embodiment are denoted by the same reference characters, and will not be redundantly described below.

In the vehicle travel control apparatus of the fifth embodiment, an output adjustment portion adjusts the output of the vehicle so as to evade the entrance of a succeeding vehicle into the dilemma zone and the entrance thereof into the optional zone.

The vehicle travel control apparatus of the fifth embodiment will be concretely described. For comparison, the vehicle travel control apparatus of the fourth embodiment induces the host vehicle so that the host vehicle will not enter the optional zone, when there is a succeeding vehicle behind the host vehicle. Therefore, the apparatus of the fourth embodiment is able to evade the risk of the host vehicle having a rear-end collision with the succeeding vehicle. However, if the succeeding vehicle enters the dilemma zone or the optional zone, the succeeding vehicle may collide into the rear end of the host vehicle.

To overcome this, in the fifth embodiment, when the host vehicle is not in the dilemma zone nor in the optional zone and it is possible to carry out the induction control, the host vehicle is induced so as to evade the entrance of the succeeding vehicle into the dilemma zone and the entrance thereof into the optional zone. In this case, since a succeeding vehicle is not sure to follow the acceleration/deceleration of the host vehicle, the induction of the host vehicle is not carried out when the succeeding vehicle is approaching the host vehicle from a long inter-vehicle distance behind the host vehicle. Besides, when a succeeding vehicle continues to perform the following traveling with respect to the host vehicle, the follow characteristic is good and variation of the inter-vehicle distance is small, and therefore the induction of the host vehicle is carried out. On the other hand, when the following travel characteristic of a succeeding vehicle is not good, for example, when the inter-vehicle distance between the host vehicle and the succeeding vehicle shortens, the induction of the host vehicle is not carried out.

A process of generating an acceleration/deceleration-correspondent map in the vehicle travel control apparatus of the fifth embodiment will be described in detail with reference to a flowchart shown in FIG. 8.

In step S91 in the generation process for an acceleration/deceleration-correspondent map in the vehicle travel control apparatus of the fifth embodiment, before the host vehicle approaches a traffic light, that is, before the vehicle travel control apparatus receives information regarding the switching of the traffic light via the navigation system 18, the control apparatus records changes in the inter-vehicle time between the host vehicle and a succeeding vehicle, and calculates a standard deviation of the inter-vehicle time (about 1 to 2 seconds) between the host vehicle and the succeeding vehicle, as shown in FIG. 1 and FIG. 8. In step S92, the foregoing generation process for an acceleration/deceleration-correspondent map in the fourth embodiment is executed.

In step S93, it is determined whether or not the host vehicle has already entered the dilemma zone or the optional zone and an acceleration/deceleration-correspondent map GM1 for evading the entrance into this zone has been generated (the host vehicle has been induced). If in this step it is determined that the host vehicle has been induced by the generated acceleration/deceleration-correspondent map GM1, this routine is ended without performing any further operation. On the other hand, if it is determined that an acceleration/deceleration-correspondent map GM1 has not been generated and the host vehicle has not been induced, then the state of the succeeding vehicle is estimated in step S94. That is, the distance from the present traveling position of the succeeding vehicle to the traffic light is calculated by using the following expression (6).

$$\text{(distance from the succeeding vehicle to the traffic signal)} = \text{(distance from the host vehicle to the traffic light)} + \text{(inter-vehicle distance)} \quad (6)$$

Next, on the basis of the velocity of the succeeding vehicle and the distance from the succeeding vehicle to the traffic light, the distance to the traffic light stop line from the traveling position of the succeeding vehicle at the planned start time of the yellow light is estimated from the present velocity of the vehicle and the present distance thereof to the traffic light on the assumption that the present velocity thereof continues. Then, on the basis of the velocity of the succeeding vehicle and the distance from the succeeding vehicle to the traffic light, a process of determining whether or not the succeeding vehicle is in the dilemma zone (or the optional zone) (in step S16 in FIG. 2) in the first embodiment is executed.

In step S95, it is determined whether or not the succeeding vehicle is going to enter the dilemma zone or the optional zone, on the basis of a result of the estimation in step S94. If in this step it is determined that the succeeding vehicle is not going to enter either the dilemma zone or the optional zone, this routine is ended without performing any further operation. On the other hand, if it is determined that the succeeding vehicle is going to enter the dilemma zone or the optional zone, it is then determined in step S96 whether or not the succeeding vehicle has been approaching the host vehicle. This is determined on the basis of whether or not the inter-vehicle time between the host vehicle and the succeeding vehicle has been decreasing for at least 2 seconds. If it is determined that the succeeding vehicle has been approaching the host vehicle, this routine is ended without performing any further operation, since the succeeding vehicle cannot be expected to appropriately follow the host vehicle and there is a risk of the succeeding vehicle colliding into a rear end of the host vehicle.

On the other hand, if it is determined that the succeeding vehicle is not approaching, it is then determined in step S97 whether or not the follow-up of the succeeding vehicle with respect to the host vehicle is bad. This is determined on the basis of, for example, whether or not the standard deviation of the inter-vehicle time between the host vehicle and the succeeding vehicle is greater than or equal to 0.5 second. If it is determined that the standard deviation of the inter-vehicle time between the host vehicle and the succeeding vehicle is greater than or equal to 0.5 second and therefore the follow-up characteristic of the succeeding vehicle is bad, this routine is ended without performing any further operation. On the other hand, if in step S97 it is determined that the follow-up characteristic of the succeeding vehicle with respect to the host vehicle is good, the process proceeds to S98, in which, as in the foregoing process of steps S17 to S31 in the first embodiment, the gradient of the acceleration/deceleration-correspondent map GM1 at the intersection point P1 between the basic map BM1 and the evasive induction target acceleration/deceleration is set according to the distance to the traffic light stop line from the traveling position of the host vehicle at the planned time of start of the yellow light which is estimated from the present traveling position of the host vehicle. Then, using the gradient, an acceleration/deceleration-correspondent map GM1 is generated in step S99.

thus, the vehicle travel control apparatus of the fifth embodiment adjusts the output of the host vehicle so as to evade the entrance of a succeeding vehicle into the dilemma zone and the entrance thereof into the optional zone. Hence, abnormal approach of the succeeding vehicle to the host vehicle can be prevented, and the entrance of the succeeding vehicle into either the dilemma zone or the optional zone can be evaded, so that travel safety of the succeeding vehicle as well as of the host vehicle can be improved.

Figure 9:
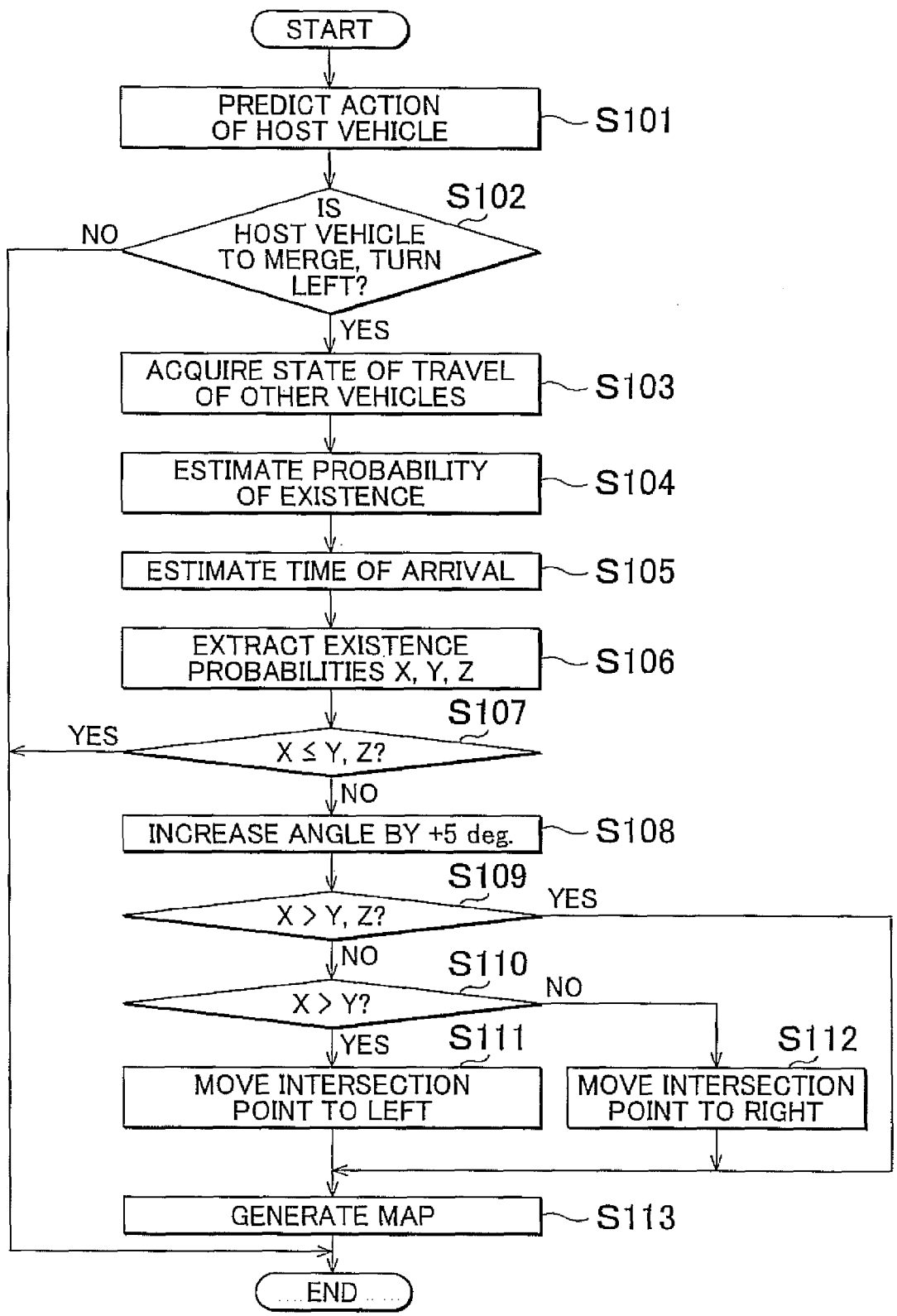
FIG. 9 is a flowchart for generating an acceleration/deceleration-correspondent map in a vehicle travel control apparatus in accordance with a sixth embodiment of the invention.
Figure 10:
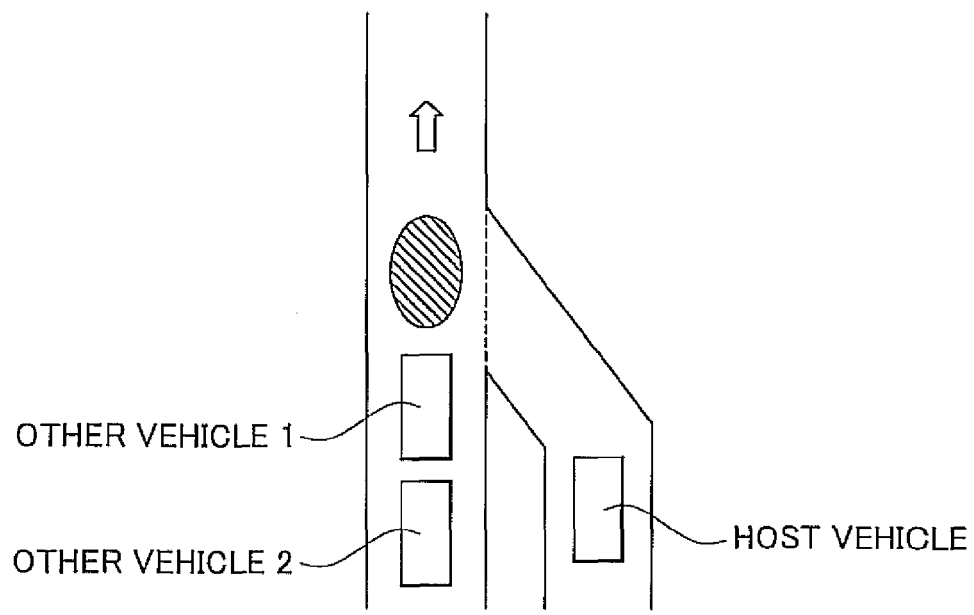
FIG. 10 is a schematic diagram representing a situation of a left turn of a vehicle at a merging point.
Figure 11:
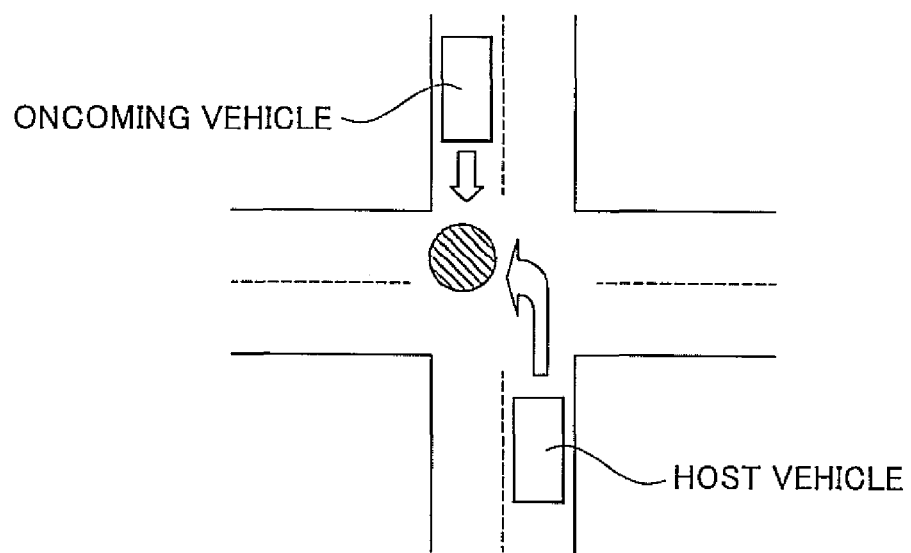
FIG. 11 is a schematic diagram representing a situation of a left turn of a vehicle at an intersection.
Figure 12:
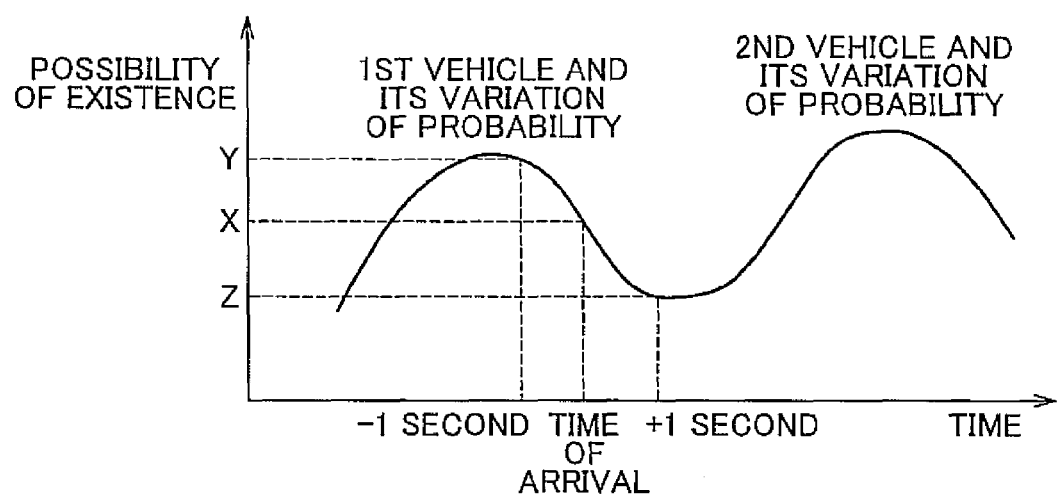
FIG. 12 is a graph representing the probability of the existence of a vehicle with respect to time.

FIG. 9 is a flowchart for generating an acceleration/deceleration-correspondent map in a vehicle travel control apparatus in accordance with a sixth embodiment of the invention. FIG. 10 is a schematic diagram representing a situation of a left turn of a vehicle at a merging point. FIG. 11 is a schematic diagram representing a situation of a left turn of a vehicle at an intersection (i.e., such a turn of a vehicle at an intersection that the vehicle turns across the opposing traffic stream). FIG. 12 is a graph representing establishment of the existence of a vehicle with respect to time. Incidentally, the overall construction of the vehicle travel control apparatus of this embodiment is substantially the same as that of the foregoing first embodiment, and will be described with reference to FIG. 1 as well. The members and the like that have substantially the same functions as those described above in conjunction with the first embodiment are denoted by the same reference characters, and will not be redundantly described below.

As for the vehicle travel control apparatus of the sixth embodiment, a region undesirable to the driver of a vehicle is a merging point of travel paths, or an intersection of travel paths (a movement path changing point). When the probability of existence of one or more other vehicles at such a merging point or an intersection is high, the degree of increase and the degree of decrease in the output of the vehicle relative to the amount of operation of the accelerator pedal are increased.

The vehicle travel control apparatus of the sixth embodiment will be concretely described. For comparison, the vehicle travel control apparatus of the first embodiment is able to perform induction such that the host vehicle will not enter the dilemma zone at an intersection. However, it is difficult to smoothly induce the vehicle in a section where a plurality of paths overlap, at the time of moving into the mainline of traffic at a merging point of travel paths, or at time of left turn at an intersection.

Therefore, in the sixth embodiment, the entrance of the vehicle into the dilemma zone is evaded when the vehicle moves into the mainstream of traffic. Besides, before the host vehicle reaches the merging point of the travel path, the inter-vehicle distance between the host vehicle and the preceding vehicle and the inter-vehicle distance between the host vehicle and the succeeding vehicle, and the relative velocities thereof are measured, and the host vehicle is induced to a position and a velocity that make it easy to merge into the main traffic stream. Besides, when the host vehicle turns left at an intersection (movement path changing point), the host vehicle is induced so as not to interfere with an oncoming vehicle. Concretely, in a region of interference, such as a merging point, an intersection, etc., the probability of existence of the vehicle at every predetermined time on the assumption of a constant velocity of traveling, and the gradient of the map in a section in which the probability of existence of the vehicle is high is made steep for suitable evasive induction.

A process of generating an acceleration/deceleration-correspondent map in the vehicle travel control apparatus of the sixth embodiment will be described in detail with reference to a flowchart shown in FIG. 9.

In step S101 in the generation process for an acceleration/deceleration-correspondent map in the vehicle travel control apparatus of the sixth embodiment, a section where a plurality of travel paths overlap, such as a merging point of travel paths, an intersection, etc., is read from the map database, via the navigation system 18, and behavior of the host vehicle is predicted on the basis of a velocity pattern that is accordingly generated, as shown in FIG. 1 and FIG. 9. In step S102, it is determined whether or not the host vehicle is going to make a lower-priority action to the higher-priority traffic stream when the host vehicle reaches a merging point or an intersection of travel paths. That is, it is determined whether or not the host vehicle performs an action of entering the main-line travel path at the merging point as shown in FIG. 10, or performs an action of turning left at an intersection (turning across the opposing traffic stream) as shown in FIG. 11.

If in this step it is determined that the host vehicle is not going to enter the main-line travel path at the merging point, or not going to turn left at the intersection, this routine is ended without performing any further operation. On the other hand, if it is determined that the host vehicle is going to enter the main-line travel path at the merging point or turn left at the intersection, the process proceeds to step S103, in which the traveling situations of other vehicles in the priority travel path (main-line travel path) or of oncoming vehicles are acquired via the navigation system 18, or via communication with cameras that are provided at the merging point or the intersection. Then, in step S104, on the basis of the acquired traveling situations of other vehicles or oncoming vehicles, the probability of existence of other vehicles (oncoming vehicles) at the merging point or the intersection is estimated on the assumption that a constant velocity of the vehicle continues. In step S105, it is assumed that host vehicle will maintain the present velocity, and the time at which the host vehicle will reach the merging point or the intersection is estimated.

Then, in step S106, as shown in FIG. 12, the probability of existence X of an other vehicle (oncoming vehicle) at the time when the host vehicle reaches the merging point or the intersection is firstly extracted, and then the probability of existence Y of an other vehicle (oncoming vehicle) immediately before (e.g., one second before) the host vehicle reaches the merging point or the intersection is extracted, and finally the probability of existence Z of an other vehicle (oncoming vehicle) immediately after (e.g., one second after) the host vehicle reaches the merging point or the intersection is extracted.

In step S107, it is determined whether or not the probability of existence X is less than or equal to the probabilities of existence Y and Z. If in this step it is determined that the probability of existence X is less than or equal to the probabilities of existence Y and Z, the present situation is the best situation, and therefore this routine is ended. On the other hand, if it is determined that it is not the case that the probability of existence X is less than or equal to the probabilities of existence Y and Z, the process proceeds to step S108, in which in order to generate an acceleration/deceleration-correspondent map GM1, the gradient of the acceleration/deceleration-correspondent map GM1 at the intersection point P1 between the basic map BM1 and the evasive induction target acceleration/deceleration is set at an angle (e.g., 50 degrees) that is slightly steeper than the gradient angle (45 degrees) of the basic map BM1.

In step S109, it is determined whether or not the probability of existence X is greater than the probabilities of existence Y and Z. If it is determined that the probability of existence X is greater than the probabilities of existence Y and Z, it means that there is no problem with acceleration or deceleration of the host vehicle, and the process proceeds to step S113. On the other hand, if it is determined that it is not the case that the probability of existence X is greater than the probabilities of existence Y and Z, it is then determined in step S110 whether or not the probability of existence X is greater than the probability of existence Y. If in this it is determined that the probability of existence X is greater than the probability of existence Y, that is, if it is determined that the probability of existence X is less than or equal to the probability of existence Z, the process proceeds to step S111, in which the position of the intersection point P1 on the acceleration/deceleration-correspondent map GM1 is moved leftward, that is, moved in such a direction that the accelerator pedal angle decreases (e.g., by −5%) while the evasive induction target acceleration/deceleration is maintained. That is, the acceleration/deceleration-correspondent map GM1 is corrected to a velocity-increasing induction map.

On the other hand, if in step S110 it is determined that the probability of existence X is not greater than the probability of existence Y, which means that the probability of existence X is greater than the probability of existence Z, then the process proceeds to step S112, in which the position of the intersection point P1 on the acceleration/deceleration-correspondent map GM1 is moved rightward, that is, moved in such a direction that the accelerator pedal angle increases (e.g., by +5%) while the evasive induction target acceleration/deceleration is maintained. That is, the acceleration/deceleration-correspondent map GM1 is corrected to a deceleration induction map. Then in step S113, the set position of the intersection point P1 and the set gradient are applied to generate an acceleration/deceleration-correspondent map GM1.

Thus, in the vehicle travel control apparatus of the sixth embodiment, the region undesirable to the driver of the vehicle is a merging point or an intersection. When the probability of existence of one or more other vehicles at a merging point or an intersection is high, the degree of increase or the degree of decrease in the output of the vehicle relative to the amount of operation of the accelerator pedal is increased. Therefore, when the vehicle merges into a higher-priority traffic stream or turns left at an intersection or the like, the interference with another vehicle is evaded, so that the travel safety can be improved.

Figure 13:
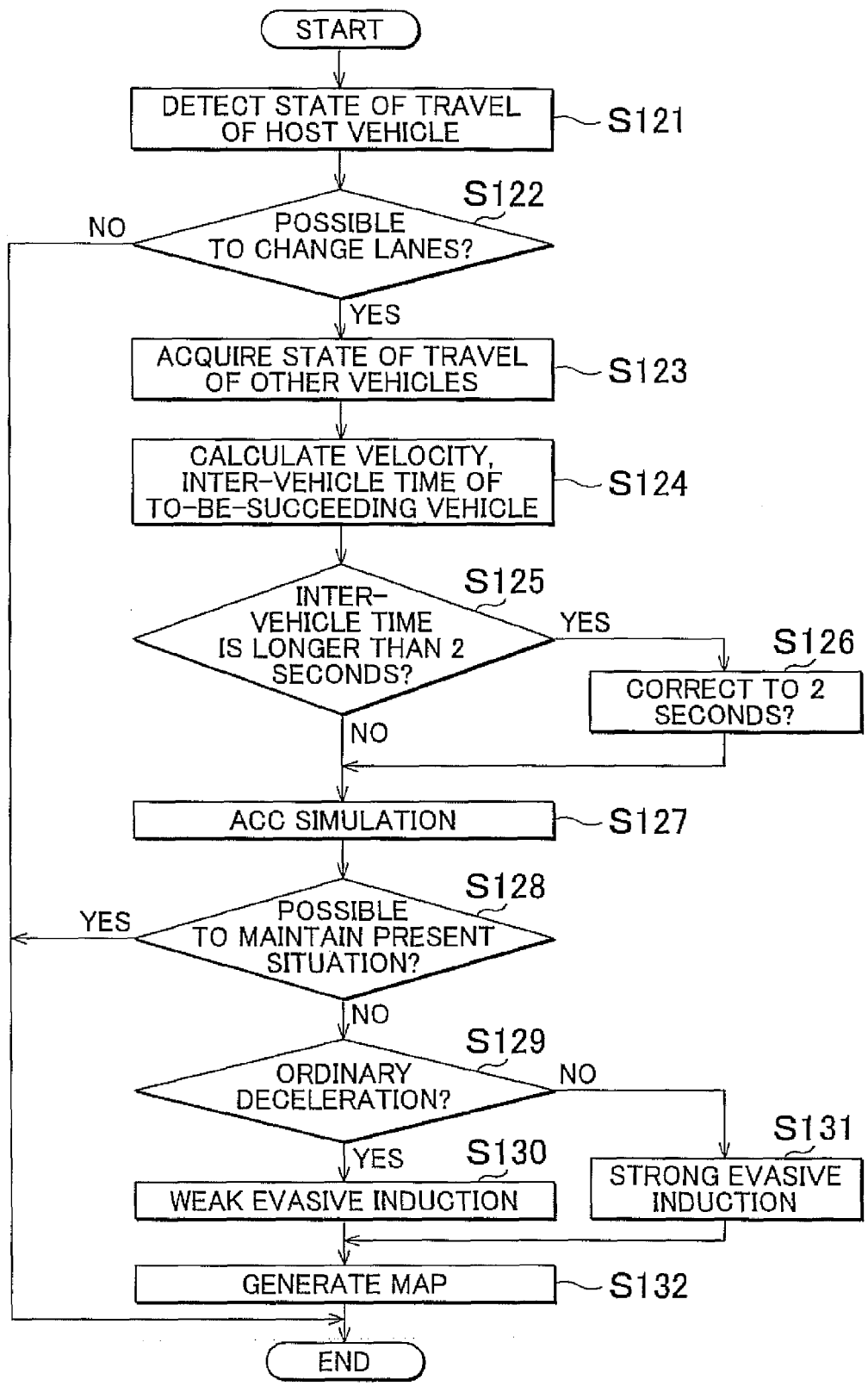
FIG. 13 is a flowchart for generating an acceleration/deceleration-correspondent map in a vehicle travel control apparatus in accordance with a seventh embodiment of the invention.
Figure 14:
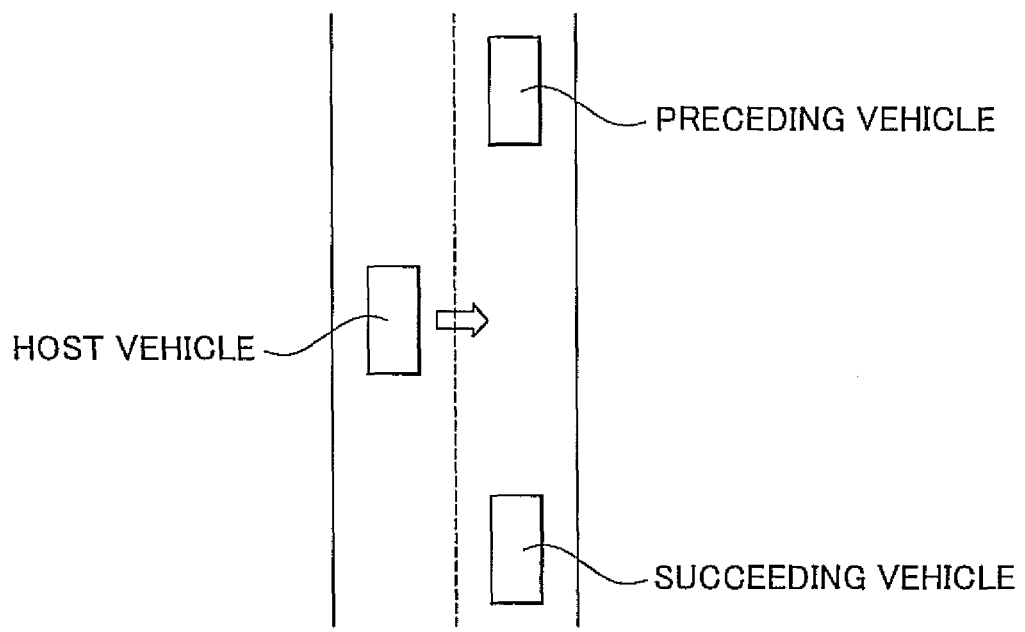
FIG. 14 is a schematic diagram representing a traveling situation of a vehicle at the time of lane change.

FIG. 13 is a flowchart for generating an acceleration/deceleration-correspondent map in a vehicle travel control apparatus in accordance with a seventh embodiment of the invention. FIG. 14 is a schematic diagram representing a traveling situation of a vehicle at the time of changing lanes.

Incidentally, the overall construction of the vehicle travel control apparatus of this embodiment is substantially the same as that of the foregoing first embodiment, and will be described with reference to FIG. 1 as well. The members and the like that have substantially the same functions as those described above in conjunction with the first embodiment are denoted by the same reference characters, and will not be redundantly described below.

In the vehicle travel control apparatus of the seventh embodiment, a region undesirable to the driver of the vehicle is a merging point where the host vehicle changes lanes, and the degree of increase and the degree of decrease in the output of the vehicle relative to the amount of operation of the accelerator pedal are increased when the acceleration/deceleration of one or more other vehicles cannot be maintained at the merging point due to the lane change of the host vehicle.

The vehicle travel control apparatus of the seventh embodiment will be concretely described. For comparison, the vehicle travel control apparatus of the first embodiment is able to induce the host vehicle so as not to enter the dilemma zone at a signalized intersection. However, it is difficult for the vehicle travel control apparatus of the first embodiment to smoothly induce the vehicle for the lane change of the vehicle.

Therefore, in the seventh embodiment, in the case where an ACC (adaptive cruise control) system of a vehicle, that is, an automatic inter-vehicle distance control system, is assumed, evasive induction of the vehicle is performed when the performance level is not appropriate. That is, in the case where it is assumed that the present acceleration/deceleration of the host vehicle continues, a strong evasive induction of the host vehicle is executed when a vehicle traveling in a lane into which the host vehicle is going to merge cannot accept the entrance of the vehicle. Besides, when a vehicle traveling in a lane into which the host vehicle is going to merge has to increase the deceleration in order to accept the entrance of the host vehicle, a weak induction of the host vehicle is executed. Furthermore, when a vehicle traveling in a lane into which the host vehicle is going to merge is allowed to maintain its present acceleration/deceleration, evasive induction of the host vehicle is not executed.

A process of generating an acceleration/deceleration-correspondent map in the vehicle travel control apparatus of the seventh embodiment will be described in detail with reference to a flowchart shown in FIG. 13.

In step S121 in the generation process for an acceleration/deceleration-correspondent map in the vehicle travel control apparatus of the seventh embodiment, a situation of a travel path along which the host vehicle is presently traveling is acquired from the map database via the navigation system 18 as shown in FIG. 1 and FIG. 13. In step S122, it is determined whether or not the travel path along which the host vehicle is presently traveling is a travel path in which a lane change is possible. If in this step it is determined that the travel path along which the host vehicle is presently traveling is not a travel path in which the lane change is possible, this routine is ended without performing any further operation. Incidentally, regardless of whether there is only one lane or a plurality of lanes in the traveling direction of the host vehicle, it is determined that the travel path is not a travel path in which the lane change is possible, if the lane change is prohibited.

On the other hand, if it is determined that the travel path along which the host vehicle is presently traveling is a travel path in which the lane change is possible, the process proceeds to step S123. In step S123, a traveling situation of an other vehicle in the lane into which the host vehicle moves as shown in FIG. 14 (reception-side lane) is acquired, via the navigation system 18 or via a perimeter-monitoring radar mounted in the host vehicle, vehicle-to-vehicle communication, etc. Then, in step S124, on the basis of the acquired traveling situation of one or more other vehicles, the front inter-vehicle time ((inter-vehicle distance)/(traveling velocity)) of a vehicle that becomes the succeeding vehicle to the host vehicle when the host vehicle has entered the reception-side lane) is calculated as well as the traveling velocity of the same vehicle ((host vehicle velocity)+(relative velocity)).

In step S125, it is determined whether or not the front inter-vehicle time of the succeeding vehicle is greater than or equal to a predetermined time (e.g., 2 seconds) that is set beforehand. If the front inter-vehicle time of the succeeding vehicle is greater than or equal to the predetermined time, the front inter-vehicle time of the succeeding vehicle is set at the predetermined time (2 seconds) in step S126. On the other hand, if the front inter-vehicle time of the succeeding vehicle is less than the predetermined time, the process proceeds to step S127. In step S127, a simulation is performed to see what changes in velocity the succeeding vehicle is going to experience if the succeeding vehicle performs the ACC control so as to maintain the present inter-vehicle time or the set inter-vehicle time in the case where the host vehicle performs the lane change while maintaining the present acceleration.

In step S128, from a result of the simulation of the succeeding vehicle, it is determined whether or not the succeeding vehicle can maintain the present acceleration/deceleration. If in this step it is determined that it is possible for the succeeding vehicle to maintain the present acceleration/deceleration, this routine is ended without performing any further operation. On the other hand, if it is determined that it is impossible for the succeeding vehicle to maintain the present acceleration/deceleration, it is then determined in step S129 whether or not the succeeding vehicle can accept the entry of the host vehicle by performing an ordinary decelerating action (e.g., of 0.2 G or less).

If in this step it is determined that it is possible for the succeeding vehicle to accept the entry of the host vehicle by performing an ordinary decelerating action, a weak induction is executed for the host vehicle in step S130. That is, in order to generate an acceleration/deceleration-correspondent map GM1, the gradient of the acceleration/deceleration-correspondent map GM1 at the intersection point P1 between the basic map BM1 and the evasive induction target acceleration/deceleration is set at an angle (e.g., 50 degrees) that is slightly steeper than the gradient angle (45 degrees) of the basic map BM1. On the other hand, if it is determined that it is impossible for the succeeding vehicle to accept the entry of the host vehicle by performing an ordinary decelerating action, a strong induction is executed for the host vehicle in step S131. That is, in order to generate an acceleration/deceleration-correspondent map GM1, the gradient of the acceleration/deceleration-correspondent map GM1 at the intersection point P1 between the basic map BM1 and the evasive induction target acceleration/deceleration is set at an angle (e.g., 60 degrees) that is steeper than the gradient angle (45 degrees) of the basic map BM1. Then, in step S132, an acceleration/deceleration-correspondent map GM1 is generated by applying the set gradient.

Thus, in the vehicle travel control apparatus of the seventh embodiment, the region undesirable to the driver is the merging point in the case of changing lanes, and when the acceleration/deceleration of an other vehicle at the merging point cannot be maintained, the degree of increase and the degree of decrease in the output of the vehicle relative to the amount of operation of the accelerator pedal is increased. Hence, when the vehicle moves from one lane to another, the interference with one or more other vehicles can be evaded, so that travel safety can be improved.

As described above, the vehicle travel control apparatus according to the invention reduces the burden on the driver of the vehicle through a proper travel assist performed by adjusting the degree of increase and the degree of decrease in the output of the vehicle to a degree that is greater the smaller the amount of increase or the amount of decrease of an operation member on the basis of the state of travel of the vehicle, when the amount of operation of the operation member increases or decreases. The vehicle travel control apparatus also improves travel safety by evading an undesirable state of travel of the vehicle. Thus, the vehicle travel control apparatus of the invention is useful in the application to any vehicle.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A vehicle travel control apparatus that controls state of travel of a vehicle, comprising:
    an accelerator pedal sensor that detects an amount of depression of an accelerator pedal;
    a vehicle travel state detection portion that detects the state of travel of the vehicle; and
    an output adjustment portion that adjusts a degree of increase or a degree of decrease in an output of the vehicle relative to the amount of depression of the accelerator pedal, based on the state of travel of the vehicle;
    the output adjustment portion adjusts the degree of increase in the output of the vehicle to a degree that is greater the smaller the amount of increase in the amount of depression of the accelerator pedal, when the amount of depression of the accelerator pedal increases;
    the output adjustment portion adjusts the degree of decrease in the output of the vehicle to a degree that is greater the smaller the amount of decrease in the amount of depression of the accelerator pedal, when the amount of depression of the accelerator pedal decreases.

2. The vehicle travel control apparatus according to claim 1, wherein the vehicle travel state detection portion has a vehicle entrance prediction portion that predicts entrance of the vehicle into a dilemma zone, based on the state of travel of the vehicle, the dilemma zone is defined by a possible-to-stop curve and a possible-to-pass straight line, the possible-to-stop curve represents velocity of the vehicle and a distance of the vehicle to a traffic light stop line which have such a relation that a stop position at which the vehicle traveling at the velocity and at the distance is able to stop through deceleration coincides with the traffic light stop line, the possible-to-pass straight line represents the velocity of the vehicle and the distance of the vehicle to the traffic light stop line from which the vehicle is expected to pass the traffic light stop line before the vehicle is not allowed to pass the traffic light stop line; and
    wherein the output adjustment portion adjusts the output of the vehicle so as to evade the entrance of the vehicle into the dilemma zone.

3. The vehicle travel control apparatus according to claim 2, wherein when there is a preceding vehicle that precedes the vehicle, the output adjustment portion executes at least one of reducing the degree of increase in the output of the vehicle relative to the amount of operation of the accelerator and increasing the degree of decrease in the output of the vehicle relative to the amount of operation of the accelerator pedal.

4. The vehicle travel control apparatus according to claim 3, wherein the output adjustment portion alters the degree of increase or the degree of decrease in the output of the vehicle relative to the amount of operation of the accelerator pedal based on a positional relation of the preceding vehicle to the dilemma zone.

5. The vehicle travel control apparatus according to claim 2, wherein when there is a succeeding vehicle that succeeds the vehicle, the vehicle entrance prediction portion that predicts entrance of the vehicle into an optional zone in which the distance to the stop position from the vehicle traveling is longer than in the dilemma zone, the optional zone is defined by the possible-to-stop curve and the possible-to-pass straight line, the possible-to-stop curve represents velocity of the vehicle and the distance of the vehicle to the traffic light stop line which have such a relation that the stop position at which the vehicle traveling at the velocity and at the distance is able to stop through deceleration coincides with the traffic light stop line, the possible-to-pass straight line represents the velocity of the vehicle and the distance of the vehicle to the traffic light stop line from which the vehicle is expected to pass the traffic light stop line before the vehicle is not allowed to pass the traffic light stop line; and
    wherein the output adjustment portion adjusts the output of the vehicle so as to evade the entrance of the vehicle into the optional zone.

6. The vehicle travel control apparatus according to claim 5, wherein the output adjustment portion adjusts the output of the vehicle so as to evade the entrance of the succeeding vehicle into the dilemma zone and the entrance of the succeeding vehicle into the optional zone.

7. The vehicle travel control apparatus according to claim 1, wherein the vehicle travel state detection portion has a vehicle entrance prediction portion that predicts entrance of the vehicle into at least one of a merging point and a movement path changing point, based on the state of travel of the vehicle; and
    wherein, when probability of existence of an other vehicle at the merging point or the movement path changing point is high, the output adjustment portion adjusts the output of the vehicle so as to evade the entrance of the vehicle into the movement path changing point or the movement path changing point by increasing the degree of increase or the degree of decrease in the output of the vehicle relative to the amount of operation of the accelerator pedal.

8. The vehicle travel control apparatus according to claim 1, wherein the vehicle travel state detection portion has a vehicle entrance prediction portion that predicts entrance of the vehicle into a merging point, based on the state of travel of the vehicle; and
    wherein, when at the merging point, it is not possible to maintain acceleration/deceleration of an other vehicle if the vehicle changes lanes, the output adjustment portion adjusts the output of the vehicle so as to evade the entrance of the vehicle into the merging point by increasing the degree of increase or the degree of decrease in the output of the vehicle relative to the amount of operation of the accelerator pedal.

9. The vehicle travel control apparatus according to claim 1, wherein the output adjustment portion makes such alteration that the degree of increase or the degree of decrease in the output of the vehicle relative to the amount of operation of the accelerator pedal becomes greater.

10. The vehicle travel control apparatus according to claim 2, wherein the output adjustment portion makes such alteration that the degree of increase or the degree of decrease in the output of the vehicle relative to the amount of operation of the accelerator pedal becomes greater the shorter a distance from a present traveling position of the vehicle to the dilemma zone.

11. The vehicle travel control apparatus according to claim 2, wherein the output adjustment portion makes such alteration that the degree of increase or the degree of decrease in the output of the vehicle relative to the amount of operation of the accelerator pedal becomes greater the nearer a position of entrance of the vehicle into the dilemma zone to a central position in the dilemma zone.

12. The vehicle travel control apparatus according to claim 2, wherein, when a position of the entrance of the vehicle into the dilemma zone is near to a position at which it is possible pass the traffic light stop line before a traffic light turns red, with reference to the dilemma zone, the output adjustment portion increases the degree of increase in the output of the vehicle relative to the amount of operation of the accelerator pedal; and
    when the position of the entrance of the vehicle into the dilemma zone is near to a position at which it is possible to stop at the traffic light stop line, with reference to the dilemma zone, the output adjustment portion increases the degree of decrease in the output of the vehicle relative to the amount of operation of the accelerator pedal.

13. The vehicle travel control apparatus according to claim 9,
    wherein the vehicle travel state detection portion has a vehicle entrance prediction portion that predicts entrance of the vehicle into a dilemma zone that is defined by a possible-to-stop curve and a possible-to-pass straight line, the possible-to-stop curve represents velocity of the vehicle and distance of the vehicle to a traffic light stop line which have such a relation that a stop position at which the vehicle traveling at the velocity and at the distance is able to stop through deceleration coincides with the traffic light stop line, the possible-to-pass straight line represents the velocity of the vehicle and the distance of the vehicle to the traffic light stop line from which the vehicle is expected to pass the traffic light stop line before the vehicle is not allowed to pass the traffic light stop line; and
    wherein the output adjustment portion adjusts the output of the vehicle such alteration that the degree of increase or the degree of decrease in the output of the vehicle relative to the amount of operation of the accelerator pedal becomes greater so as to evade the entrance of the vehicle into the dilemma zone.

14. The vehicle travel control apparatus according to claim 13, wherein there is a preceding vehicle that precedes the vehicle, the output adjustment portion executes at least one of reducing the degree of increase in the output of the vehicle relative to the amount of operation of the accelerator pedal and increasing the degree of decrease in the output of the vehicle relative to the amount of operation of the accelerator pedal.

15. The vehicle travel control apparatus according to claim 14, wherein the output adjustment portion alters the degree of increase or the degree of decrease in the output of the vehicle relative to the amount of operation of the accelerator pedal based on a positional relation of the preceding vehicle to the dilemma zone.

16. The vehicle travel control apparatus according to claim 13, wherein, when there is a succeeding vehicle that succeeds the vehicle, the vehicle entrance prediction portion that predicts entrance of the vehicle into an optional zone in which the distance to the stop position from the vehicle traveling is longer than in the dilemma zone the optional zone is defined by the possible-to-stop curve and the possible-to-pass straight line, the possible-to-stop curve represents the velocity of the vehicle and the distance of the vehicle to the traffic light stop line which have such a relation that the stop position at which the vehicle traveling at the velocity and at the distance is able to stop through deceleration coincides with the traffic light stop line, the possible-to-pass straight line represents the velocity of the vehicle and the distance of the vehicle to the traffic light stop line from which the vehicle is expected to pass the traffic light stop line before the vehicle is not allowed to pass the traffic light stop line; and the output adjustment portion adjusts the output of the vehicle so as to evade the entrance of the vehicle into the optional zone.

17. The vehicle travel control apparatus according to claim 16, wherein the output adjustment portion adjusts the output of the vehicle so as to evade the entrance of the succeeding vehicle into the dilemma zone and the entrance of the succeeding vehicle into the optional zone.

18. The vehicle travel control apparatus according to claim 9, wherein the vehicle travel state detection portion has a vehicle entrance prediction portion that predicts entrance of the vehicle into at least one of a merging point and a movement path changing point; and wherein, when probability of existence of an other vehicle at the merging point or the movement path changing point is high, the output adjustment portion adjusts the output of the vehicle so as to evade the entrance of the vehicle into the movement path changing point or the movement path changing point by increasing the degree of increase or the degree of decrease in the output of the vehicle relative to the amount of operation of the accelerator pedal.

19. The vehicle travel control apparatus according to claim 9, wherein the vehicle travel state detection portion has a vehicle entrance prediction portion that predicts entrance of the vehicle into a merging point, based on the state of travel of the vehicle; and wherein, when at the merging point, it is not possible to maintain acceleration/deceleration of an other vehicle if the vehicle changes lanes, the output adjustment portion adjusts the output of the vehicle so as to evade the entrance of the vehicle into the merging point by increasing the degree of increase or the degree of decrease in the output of the vehicle relative to the amount of operation of the accelerator pedal.

20. The vehicle travel control apparatus according to claim 1, wherein the output adjustment portion has a basic map in which the a target acceleration/deceleration is set according to the amount of operation of the accelerator pedal; and wherein, when an evasive induction target acceleration/deceleration is set according to the state of travel of the vehicle, an induction map is generated by correcting the basic map so that amount of change in acceleration/deceleration of the vehicle commensurate with an operation change amount of the accelerator pedal within a predetermined range that contains the amount of operation of the accelerator pedal that corresponds to the evasive induction target acceleration/deceleration.

* * * * *

UNITED STATES PATENT AND TRADEMARK OFFICE
CERTIFICATE OF CORRECTION

| | | |
|---|---|---|
| PATENT NO. | : 8,515,615 B2 | Page 1 of 1 |
| APPLICATION NO. | : 12/791310 | |
| DATED | : August 20, 2013 | |
| INVENTOR(S) | : Koji Taguchi | |

It is certified that error appears in the above-identified patent and that said Letters Patent is hereby corrected as shown below:

In the Claims

At column 26, claim number 1, line number 39, after greater, Insert --than--

At column 26, claim number 1, line number 44, after greater, Insert --than--

At column 28, claim number 10, line number 7, after greater, Insert --than--

At column 28, claim number 11, line number 14, after greater, Insert --than--

At column 28, claim number 12, line number 19, after possible, Insert --to--

At column 30, claim number 20, line number 22, Delete, "the"

Signed and Sealed this
Second Day of December, 2014

Michelle K. Lee
*Deputy Director of the United States Patent and Trademark Office*